(12) United States Patent
Stack et al.

(10) Patent No.: US 11,280,437 B2
(45) Date of Patent: Mar. 22, 2022

(54) SEALED GAP SUB

(71) Applicant: Evolution Engineering Inc., Calgary (CA)

(72) Inventors: Luke A. Stack, Calgary (CA); Aaron W. Logan, Calgary (CA); Justin C. Logan, Calgary (CA); Patrick R. Derkacz, Calgary (CA); Gavin Gaw-Wae Lee, Calgary (CA); Hasan Alper Hepguvendik, Mississauga (CA); Mojtaba Kazemi Miraki, Calgary (CA); Daniel W. Ahmoye, Calgary (CA); Kurtis K. L. West, Calgary (CA); Angelica J. B. Francoeur, Calgary (CA)

(73) Assignee: Evolution Engineering Inc., Calgary (CA)

( * ) Notice: Subject to any disclaimer, the term of this patent is extended or adjusted under 35 U.S.C. 154(b) by 329 days.

(21) Appl. No.: 16/473,210

(22) PCT Filed: Dec. 22, 2017

(86) PCT No.: PCT/CA2017/051599
§ 371 (c)(1),
(2) Date: Jun. 24, 2019

(87) PCT Pub. No.: WO2018/112667
PCT Pub. Date: Jun. 28, 2018

(65) Prior Publication Data
US 2019/0316712 A1     Oct. 17, 2019

Related U.S. Application Data

(60) Provisional application No. 62/438,954, filed on Dec. 23, 2016.

(51) Int. Cl.
*F16L 25/02* (2006.01)
*E21B 17/00* (2006.01)
(Continued)

(52) U.S. Cl.
CPC ............ *F16L 25/02* (2013.01); *E21B 17/003* (2013.01); *E21B 17/04* (2013.01); *E21B 47/13* (2020.05); *F16L 13/10* (2013.01); *F16L 2201/40* (2013.01)

(58) Field of Classification Search
CPC .......... F16L 25/02; F16L 13/10; E21B 17/003
See application file for complete search history.

(56) References Cited

U.S. PATENT DOCUMENTS

| 4,861,074 A | * | 8/1989 | Eastlund | E21B 17/003 285/53 |
| 5,138,313 A | * | 8/1992 | Barrington | E21B 17/003 340/854.6 |

(Continued)

FOREIGN PATENT DOCUMENTS

| WO | WO-2011049573 A1 | * | 4/2011 | E21B 17/003 |
| WO | 2014075190 A1 | | 5/2014 | |

*Primary Examiner* — David Bochna
(74) *Attorney, Agent, or Firm* — Oyen Wiggs Green & Mutala LLP

(57) ABSTRACT

One or more seals may be provided in a gap sub to prevent the ingress of drilling fluid into an insulating gap between a male member of the gap sub and a female member of the gap sub. A first seal may comprise an internal gap sub seal provided near the tip of the male member of the gap sub. A second seal may comprise an external gap sub seal provided near the tip of the female member of the gap sub. The first and second seals may comprise non-conductive materials. The first and second seals may each comprise one or more O-rings. The first and second seals may comprise one or more lips, protrusions or flanges to engage the male and/or female members of the gap sub for maintaining contact with the male and/or female members during deformation of the gap sub.

42 Claims, 16 Drawing Sheets

(51) Int. Cl.
*E21B 17/04* (2006.01)
*F16L 13/10* (2006.01)
*E21B 47/13* (2012.01)

(56) References Cited

U.S. PATENT DOCUMENTS

| | | | |
|---|---|---|---|
| 6,158,532 A * | 12/2000 | Logan | E21B 17/028 |
| | | | 175/320 |
| 6,572,152 B2 | 6/2003 | Dopf et al. | |
| 7,252,160 B2 | 8/2007 | Dopf et al. | |
| 7,255,183 B2 | 8/2007 | Cramer | |
| 7,360,796 B2 | 4/2008 | Sutherland et al. | |
| 8,561,995 B2 | 10/2013 | Thomson | |
| 2008/0136122 A1 | 6/2008 | Gambier | |
| 2011/0309949 A1* | 12/2011 | Dopf | E21B 47/13 |
| | | | 340/854.6 |
| 2015/0013963 A1* | 1/2015 | McGarian | E21B 17/003 |
| | | | 166/65.1 |
| 2015/0292274 A1* | 10/2015 | Logan | E21B 17/028 |
| | | | 166/380 |
| 2015/0330155 A1* | 11/2015 | Logan | E21B 17/003 |
| | | | 166/380 |
| 2015/0337604 A1* | 11/2015 | Archuleta | E21B 47/13 |
| | | | 166/65.1 |
| 2016/0146000 A1* | 5/2016 | Logan | E21B 47/13 |
| | | | 340/853.1 |

* cited by examiner

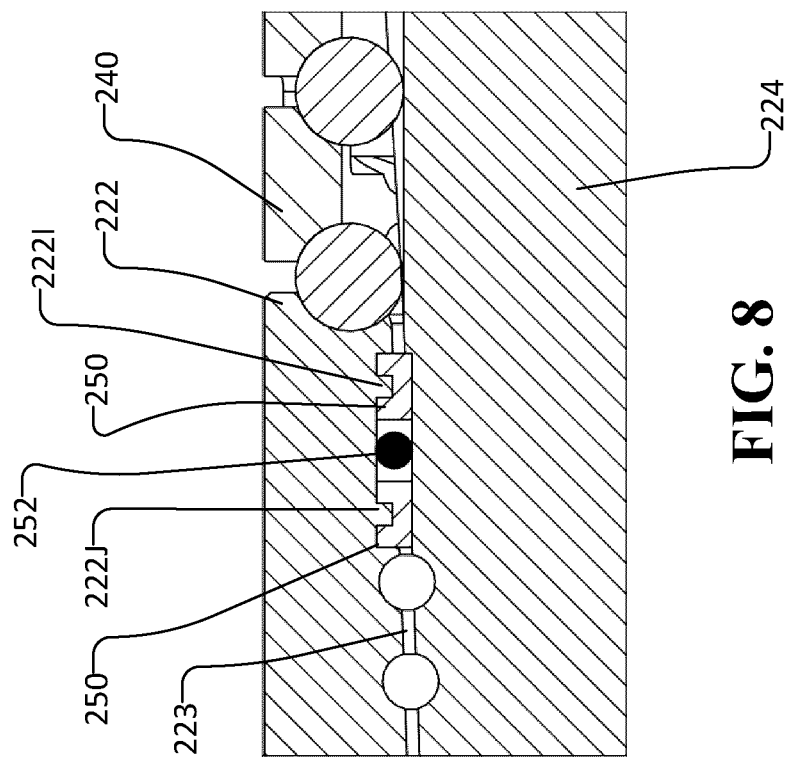

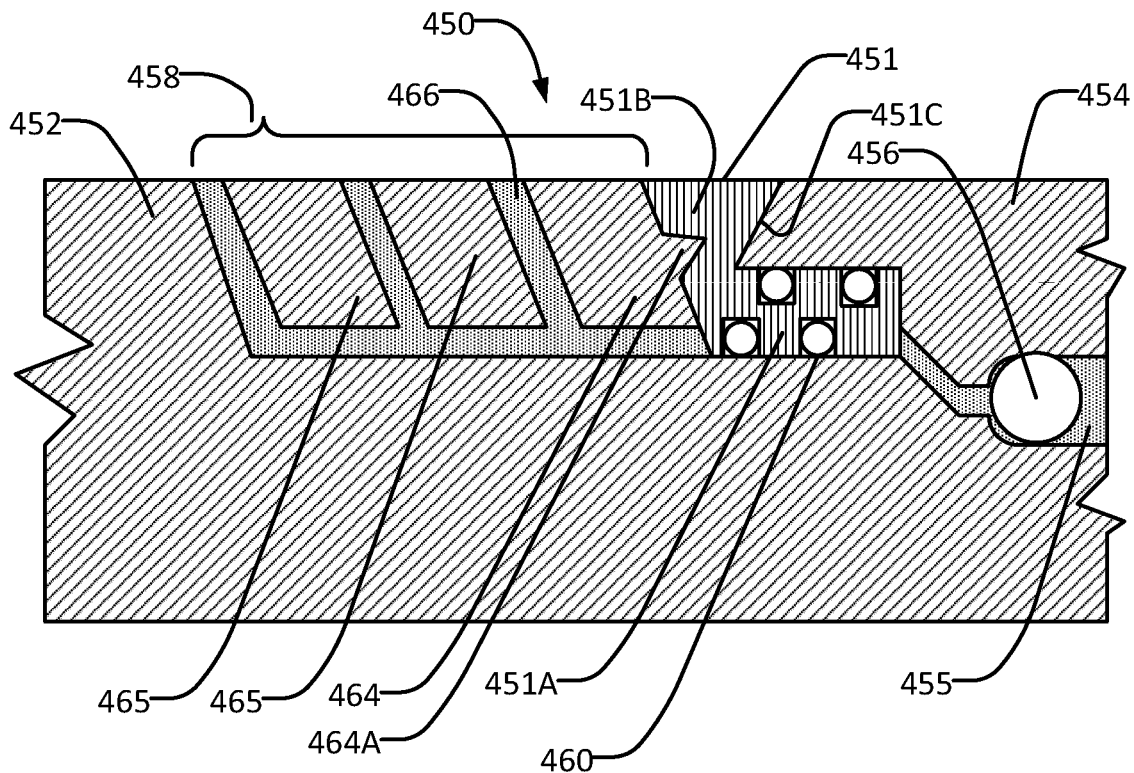
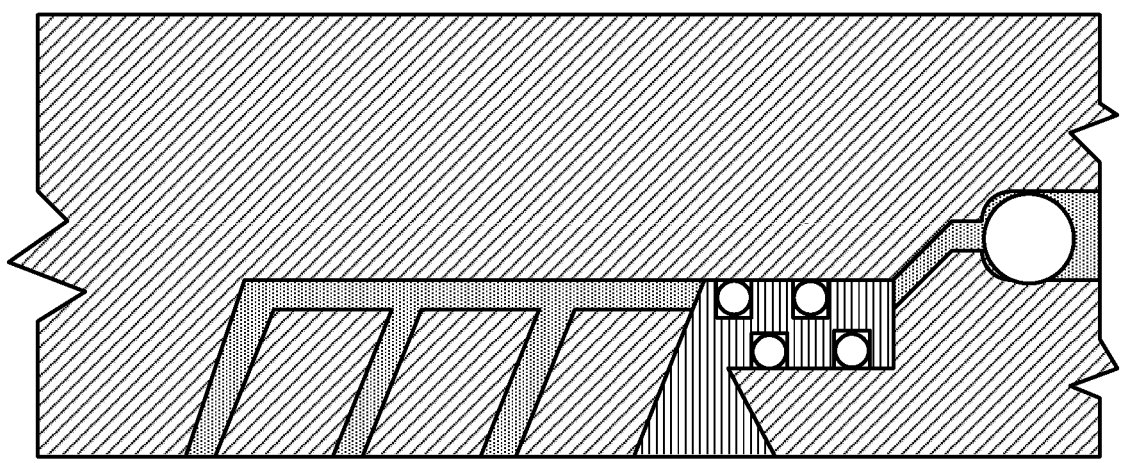
FIG. 12

SEALED GAP SUB

CROSS-REFERENCE TO RELATED APPLICATION

This application claims priority from U.S. Application No. 62/438,954 filed 23 Dec. 2016. For purposes of the United States, this application claims the benefit under 35 U.S.C. § 119 of U.S. Application No. 62/438,954 filed 23 Dec. 2016 and entitled SEALED GAP SUB which is hereby incorporated herein by reference for all purposes.

TECHNICAL FIELD

This application relates to subsurface drilling, specifically to gap sub assemblies suitable for use in measurement while drilling and methods for fabricating gap sub assemblies. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom-hole pressure to inhibit hydrocarbon influx from the formation into the wellbore and potential blow out at surface.

Bottom-hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole probe. A downhole probe may comprise any active mechanical, electronic, and/or electro-mechanical system that operates downhole. A probe may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A probe may comprise one or more systems for: telemetry of data to the surface; collecting data by way of sensors (e.g. sensors for use in well logging) that may include one or more of vibration sensors, magnetometers, inclinometers, accelerometers, nuclear particle detectors, electromagnetic detectors, acoustic detectors, and others; acquiring images; measuring fluid flow; determining directions; emitting signals, particles or fields for detection by other devices; interfacing to other downhole equipment; sampling downhole fluids; etc. A downhole probe is typically suspended in a bore of a drill string near the drill bit. Some downhole probes are highly specialized and expensive.

Downhole conditions can be harsh. Downhole equipment typically experiences high temperatures; vibrations (including axial, lateral, and torsional vibrations); shocks; immersion in drilling fluids; high pressures (20,000 p.s.i. or more in some cases); turbulence and pulsations in the flow of drilling fluid; fluid initiated harmonics; and torsional acceleration events from slip which can lead to side-to-side and/or torsional movements. These conditions can shorten the lifespan of downhole equipment.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed in a bottom hole assembly such that metallic drill pipe in the drill string above the gap sub serves as one antenna element and metallic sections below the gap sub serve as another antenna element. Electromagnetic telemetry signals can then be transmitted by applying electrical signals between the two antenna elements. The signals typically comprise very low frequency AC signals applied in a manner that codes information for transmission to the surface (higher frequency signals attenuate faster than low frequency signals). The electromagnetic signals may be detected at the surface, for example by measuring electrical potential differences between the drill string or a metal casing that extends into the ground and one or more ground rods.

Design of the gap sub is an important factor in an EM telemetry system. The gap sub must provide electrical isolation between two parts of the drill string as well as withstand the extreme mechanical loading induced during drilling and the high differential pressures that occur between the interior and exterior of the drill pipe. Drill string components are typically made from high strength, ductile metal alloys in order to handle the loading without failure. Most electrically-insulating materials suitable for electrically isolating different parts of a gap sub are weaker than metals (e.g. rubber, polymer, epoxy) and/or are quite brittle (ceramics). This makes it difficult to design a gap sub that is both configured to provide efficient transmission of EM telemetry signals and has the mechanical properties required of a link in the drill string.

In directional drilling, the trajectory of the wellbore may change rapidly, such as in building of a curve. In cases where the change in direction occurs more rapidly than planned or desired it can lead to harmful side effects within the section or "dogleg". Excessive doglegs can cause parts of the drill string passing through the doglegs to experience significant bending stresses and can increase the overall friction of the drill string. Passing through tightly-curved parts of the wellbore can increase the potential for damage and excessive wear of components such as gap subs, which can be weak links in the drill string.

Load-bearing structures in gap subs typically have diameters smaller than other parts of the drill string in order to accommodate external gaps. These load-bearing sections of gap subs can act as flex collars. Bending moments applied to gap subs can result in relatively large stresses in the load-bearing structures of the gap subs. The combined action of compressive loading resulting from bending, wear in the borehole, and/or impact with the borehole can cause dielectric material in the gap to chip out, crack or buckle.

It ought to be the case that the material filling the gap of a gap sub will keep out fluids. However, the inventors have discovered that drilling fluid may seep into the insulating gap of a gap sub over time. This may be aggravated by damage that may occur to the dielectric material in the insulating gap. The penetration of drilling fluid into the insulating gap of the gap sub may reduce the electrical resistance of the insulating gap, which is detrimental to EM telemetry. There remains a need for gap subs that are cost effective and can provide performance that remains after extended exposure to downhole conditions.

SUMMARY

The invention has a number of different aspects. These include, without limitation, gap subs having one or more seals, internal gap sub seals, external gap sub seals, methods for installing internal gap sub seals, methods for installing external gap sub seals, methods for sealing a gap sub, male tip supports and methods for preventing relative movement of male and female gap sub members.

One example aspect provides an internal gap sub seal. The internal gap sub seal may comprise a generally tubular body that may be disposed between the tip of a male member of a gap sub and a female member of a gap sub. The internal gap sub seal may comprise a non-conductive material such as a polymer. One or more O-rings may be held in place by grooves on the internal gap sub seal and/or in the gap sub members.

Another example aspect of the invention provides an external gap sub seal. The external gap sub seal may comprise a generally tubular body that may be disposed between the tip of a female member of a gap sub and a male member of a gap sub. The external gap sub seal may comprise a non-conductive material such as a polymer. One or more O-rings may be held in place by grooves on the external gap sub seal.

Another example aspect of the invention provides a gap sub comprising an internal gap sub seal and an external gap sub seal for preventing drilling fluid from entering an insulating gap between a male member and a female member of the gap sub.

Another example aspect of the invention provides a male tip support. The male tip support may comprise a circumferential channel between a male member and a female member of a gap sub. The channel may receive one or more electrically insulating bodies to secure a tip of the male member within the female member. The male tip support may assist in maintaining contact between the internal gap sub seal and the male and female members. The male tip support may reduce relative motion between the male and female gap sub members.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings illustrate non-limiting example embodiments of the invention

FIG. 8 is a magnified view of another portion of an assembled gap sub according to another embodiment.

FIG. 12 is a cross section through a gap sub according to another example embodiment.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
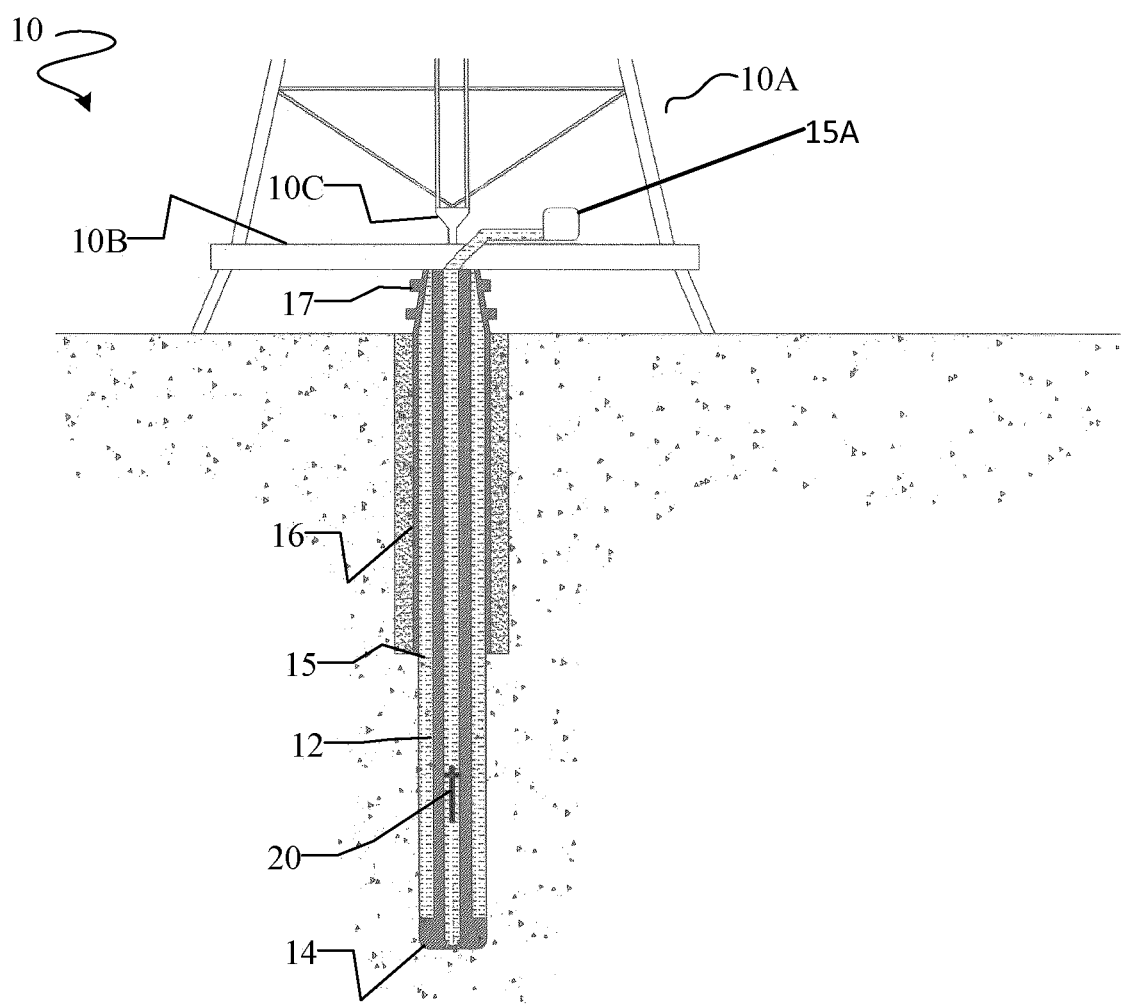
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

A gap sub 20 may be positioned, for example, at the top of the BHA. Gap sub 20 divides the drill string into two electrically-conductive parts that are electrically insulated from one another. The two parts form a dipole antenna structure. For example, one part of the dipole may be made of the BHA up to the electrically insulating gap and the other part of the dipole may be made up of the part of the drill string extending from the gap to the surface.

A very low frequency alternating current (AC) electrical signal is generated by an EM telemetry signal generator and applied across gap sub 20. The low frequency AC signal energizes the earth and creates an electrical field which results in a measurable voltage differential between the top of drill string 12 and one or more grounded electrodes (such as ground rods or ground plates). The electrical signal is varied in a way which encodes information for transmission by telemetry.

The embodiments described herein generally relate to gap sub assemblies for EM telemetry in downhole drilling. In some embodiments the gap sub assembly comprises a female member comprising a female mating member and a male member comprising a male mating member and a gap section. The male mating member is matingly received within the female mating member and electrically isolated therefrom by an insulating gap. The gap section is electrically insulating overall.

Figure 1A:
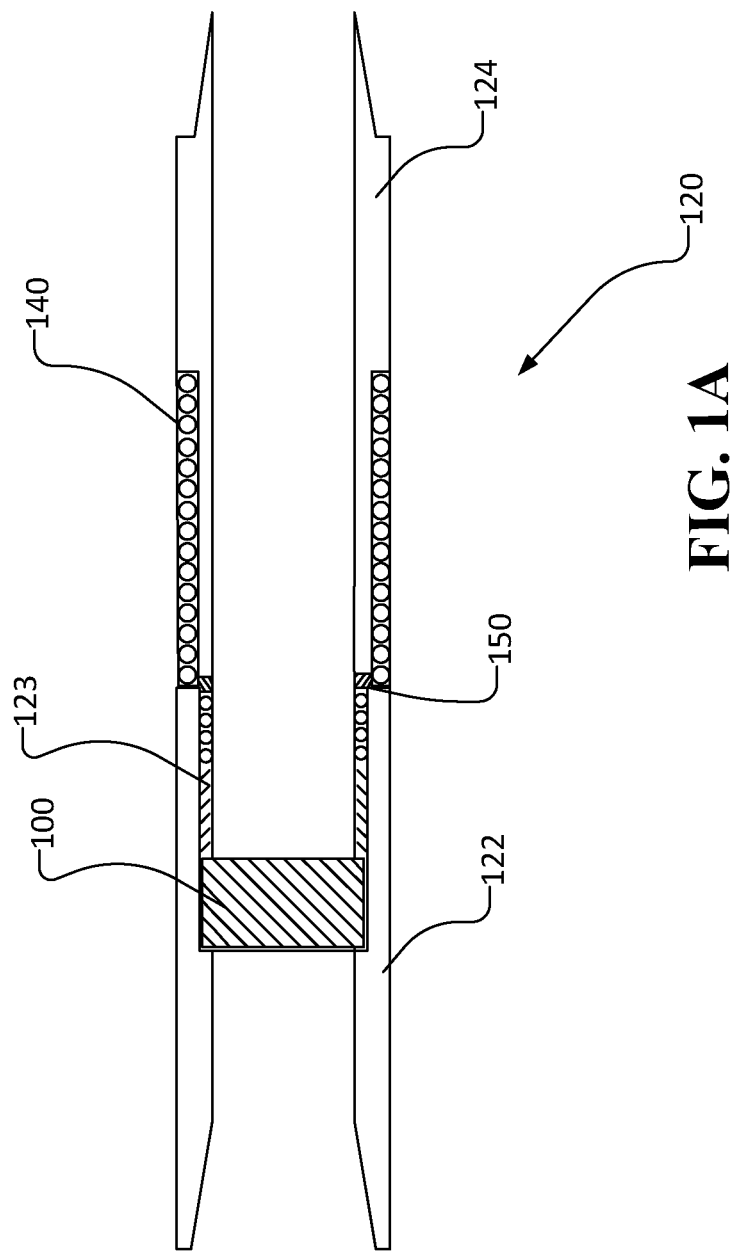
FIG. 1A is a schematic view of a gap sub according to one embodiment.

FIG. 1A schematically depicts a gap sub 120 comprising a male member 124 and a female member 122. Male member 124 may be received within female member 122. An insulating gap 123 exists between male member 124 and female member 122.

One concern when mating male member 124 and female member 122 is that drilling fluid (within the bore of gap sub 120 or external to gap sub 120) may seep into any space between male member 124 and female member 122 (e.g. insulating gap 123). Drilling fluid within insulating gap 123 may allow an electrical signal to pass between male member 124 and female member 122, reducing the voltage differential between the top of drill string 12 and the one or more grounded electrodes and thereby reducing the efficacy of the EM transmission.

Figure 2:
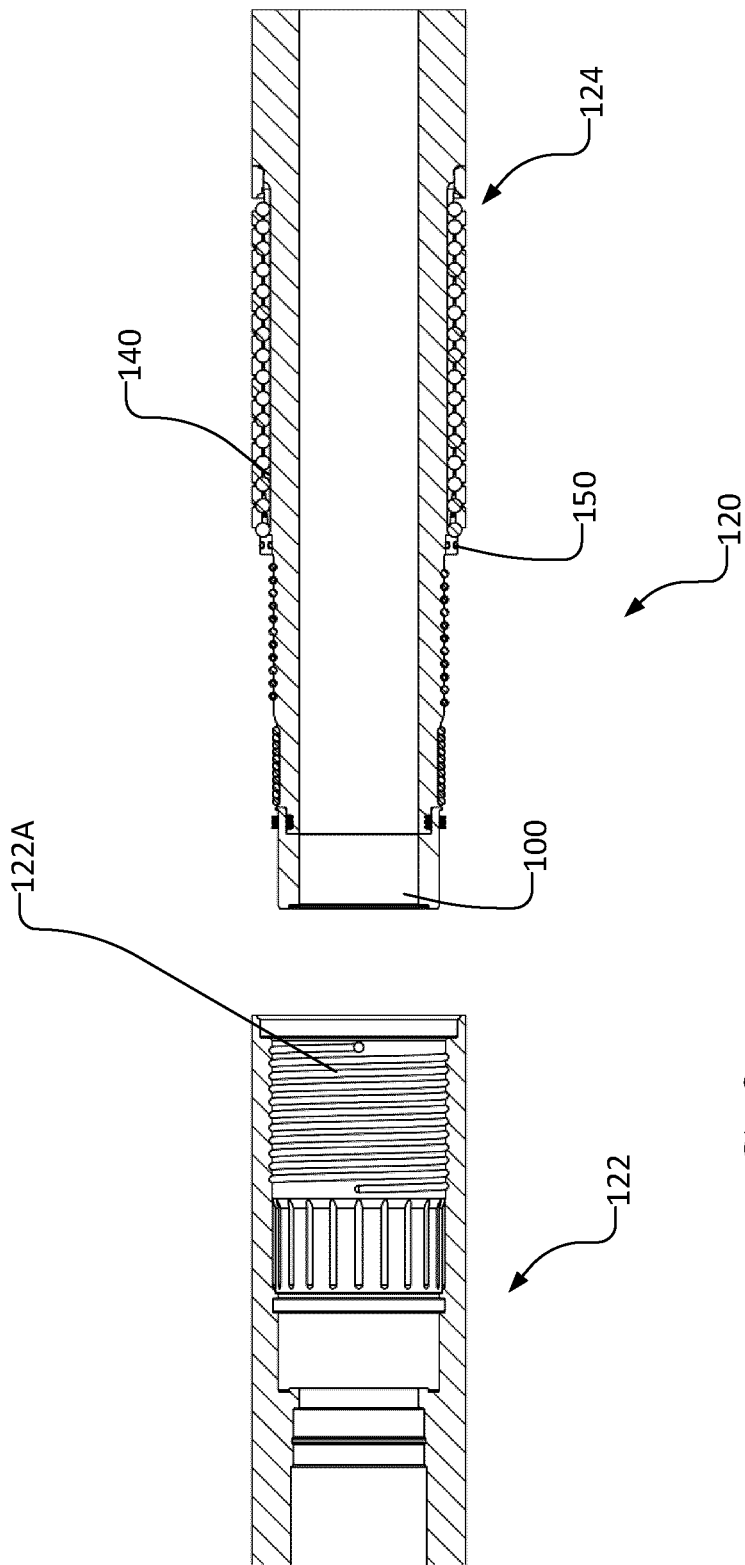
FIG. 2 is a partially exploded cross-section of a gap sub according to one embodiment.
Figure 3:
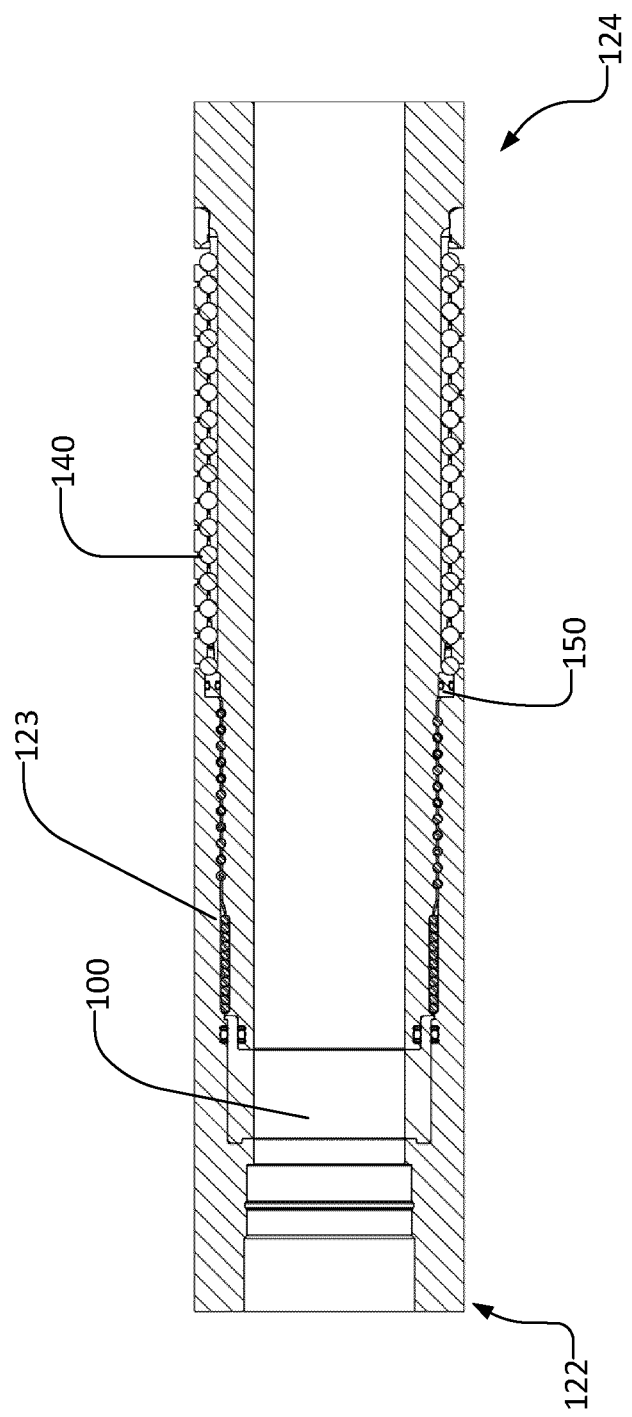
FIG. 3 is a cross-section of an assembled gap sub according to the embodiment of FIG. 2.

Various techniques may be employed to mate and isolate male member 124 and female member 122. For example, as depicted in FIGS. 2 and 3, male member 124 may be held to the female member 122 by providing electrically-insulating bodies (e.g. spheres) that engage grooves or other indentations in the male member and female member. The electrically-insulating bodies may be inserted into a gap through apertures in the male and/or the female member.

In some embodiments, a polymer material may be injected into gap 123 between male member 124 and female member 122 to improve electrical insulation there between and electrical insulation of gap sub 120. In some embodiments, polymer is injected after male member 124 and female member 122 are mated (e.g. using electrically insulating bodies).

In some embodiments, a collar 140 is positioned on the gap section and supported between two parts of the gap sub assembly. Collar 140 electrically isolates the male member from the female member. A collar 140 may be designed to resist compression when bending moments are applied to the gap sub. Presence of such a collar can reduce stresses in male member 124. Male member 124, female member 122 and insulating collar 140 function as the "gap sub" for EM telemetry. Male member 124 and female member 122 may each comprise a suitable coupling (e.g. an API standard threaded coupling) for coupling the gap sub to uphole and downhole parts of the drill string.

In some embodiments, collar 140 may be generally described as including a framework with a plurality of discrete bodies spaced within the framework. A portion of each of the discrete bodies may protrude radially outwardly past the framework. Either or both of the framework and the discrete bodies may be made of an electrical insulator material thereby electrically isolating one end of collar 140 from the other end of collar 140. Various examples of such collars are described in International Publication No. WO 2014/075190. The circumferential members may comprise rings. In a non-limiting example embodiment, the rings are metal rings and the discrete bodies comprise ceramic spheres. The rings and discrete bodies may be embedded in an electrically-insulating material (e.g. injected polymer). The rings may be shaped to provide recesses, grooves or indents to receive the discrete bodies.

Despite the use of one or more of electrically insulating bodies, injected polymer and collar 140, there may still exist a concern that drilling fluid may enter gap 123. In particular, drilling fluid may seep into gaps between the injected polymer and male member 124 or gaps between the injected polymer and female member 122. Such gaps may occur due to bending of gap sub 120, wearing of the injected polymer or for other reasons. Aspects of this invention provide methods and apparatus to prevent drilling fluid from penetrating into insulating gap 123 and reducing the electrical insulation of gap sub 120.

In some embodiments, an internal gap sub seal 100 and/or an external gap sub seal 150 is positioned on the gap section and supported between two parts of the gap sub assembly (as illustrated in FIG. 1A). Internal gap sub seal 100 and/or external gap sub seal 150 may electrically isolate the male member from the female member and may protect gap 123 between the male and female members from ingress of drilling fluid. The male member, female member and internal and/or external gap sub seal may function as the "gap sub" for EM telemetry. An internal gap sub seal and/or an external gap sub seal may be provided in conjunction with a collar.

One aspect of the invention provides an internal gap sub seal for electrically isolating a male member of a gap sub from a female member of the gap sub, preventing fluid within the gap sub from breaching the gap between the male member and the female member and preventing fluid exterior to the gap sub from breaching the internal bore or preventing sealing materials such as injected polymer from breaching the internal bore.

Figure 4:
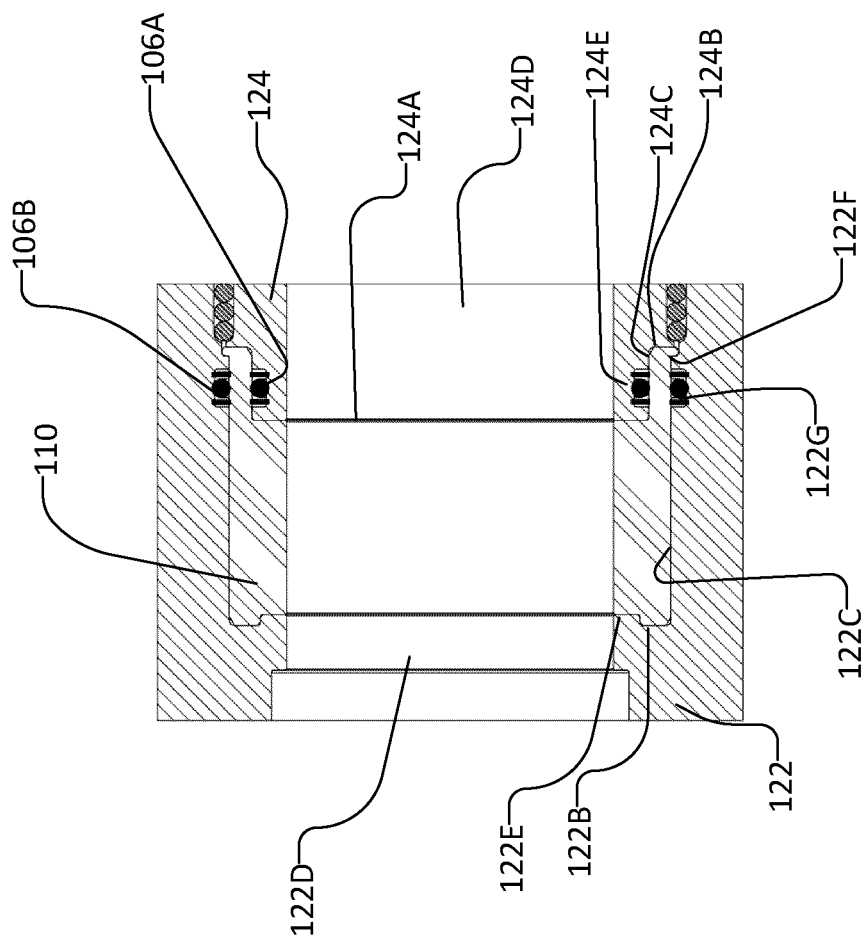
FIG. 4 is a magnified view of a portion of an assembled gap sub according to the embodiment of FIG. 2.
Figure 5:
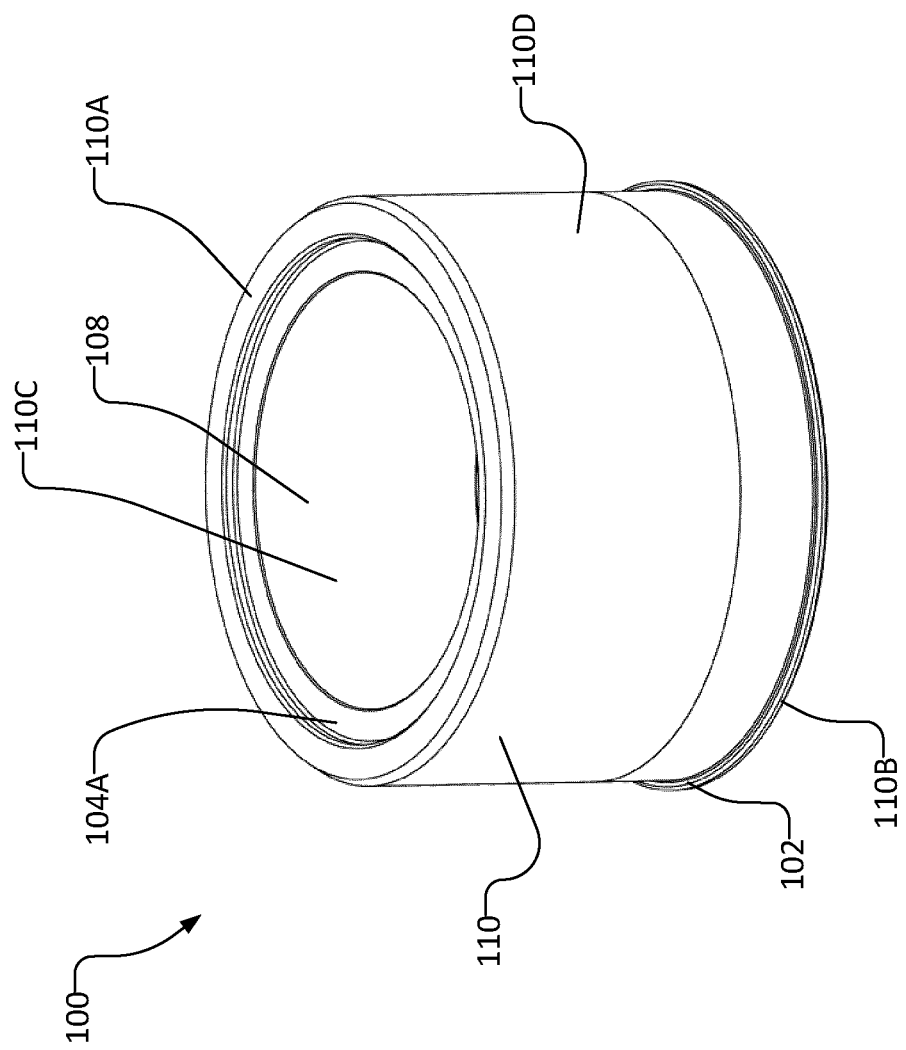
FIG. 5 is an isometric view of an internal gap sub seal according to one embodiment.

FIG. 5 depicts one embodiment of an internal gap sub seal 100. Internal gap sub seal 100 comprises a generally tubular sleeve 110 having one or more sealing features. Sealing features may include an outwardly protruding lip 102, a first internal shoulder 104A, inner O-rings 106A and outer O-rings 106B (see FIG. 4) and a second internal shoulder (not shown in FIG. 5). Internal gap sub seal 100 may have any combination of sealing features, such as, one or more of an outwardly protruding lip 102, a first internal shoulder 104A, inner O-rings 106A, outer O-rings 106B, a second internal shoulder or suitable combinations thereof.

Figure 4A:
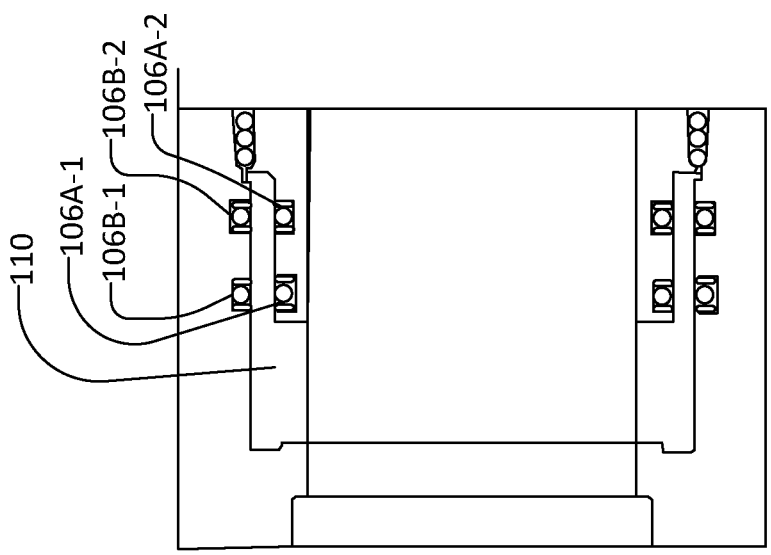
FIG. 4A is magnified view of a portion of an assembled gap sub according to another embodiment.

In some embodiments, plural O-rings 106A and/or 106B seal against sleeve 110 at axially spaced-apart locations. For example, FIG. 4A illustrates a case where internal gap sub seal 100 includes two inner O-rings 106A-1 and 106A-2 (each of which may be combined with suitable back-up rings) and two outer O-rings 106B-1 and 106B-2 (each of which may be combined with suitable back-up rings). Providing twin O-rings or, more generally, plural O-rings can help to provide As depicted in FIG. 5, tubular sleeve 110 comprises a first edge 110A, a second edge 110B, an inner surface 110C and an outer surface 110D. Outer surface 110D extends from the first edge 110A to the outwardly protruding lip 102. Outwardly protruding lip 102 defines the second edge 110B. Inner surface 110C extends between first internal shoulder 104A and the second internal shoulder. Inner surface 110C, which spans between first internal shoulder 104A and the internal second shoulder, defines internal bore 108.

Internal gap sub seal 100 may be made from a range of materials including polymers suitable for exposure to downhole conditions. Desirable attributes for the material of seal 100 and other seals described herein include: resistance to hydrolysis and chemical attack by components of drilling fluid including chlorides; high resistance to erosion and abrasion by flowing drilling fluid; high modulus; high (e.g. over 150° C.) glass transition temperature; melting point higher than downhole temperatures and higher than an injection temperature of sealing material injected into gap 123.

Some non-limiting examples of materials from which seal 100 and other seals described herein may be made are suitable thermoplastics, elastomeric polymers, rubber, and other non-conductive materials. For example internal gap sub seal 100 may be made from a suitable grade of PEEK (Polyetheretherketone), PET (Polyethylene terephthalate) or PPS (Polyphenylene sulfide) polymer. Where internal gap sub seal 100 is made of polymer, the polymer may be reinforced or fiber-filled (e.g. with glass fibers) for enhanced erosion resistance, structural stability and strength.

In some embodiments, male member 124 and female member 122 are shaped to conform or interlock with internal gap sub seal 100.

Internal gap sub seal 100 may be installed in one of male member 124 and female member 122 before male member 124 and female member 122 are mated. For example, as illustrated in FIGS. 2, 3 and 4, internal gap sub seal 100 may be installed within opening 122A of female member 122 such that first edge 110A of internal gap sub seal 100 engages a cavity 122B of female member 122, first internal shoulder 104A engages protrusion 122E of female member 122, outer surface 110D engages internal wall 122C of female member 122, and outwardly protruding lip 102 engages ledge 122F of female member 122.

In some embodiments, the engagement of internal gap sub seal 100 with female member 122 is an interference fit. In other embodiments, the engagement of internal gap sub seal 100 with female member 122 is a press fit, a snap-fit, a resilient deformation fit, a friction fit, a threaded fit, a clearance fit or another suitable type of fit. A tight fit may serve to improve the seal between female member 122, internal gap sub seal 100 and male member 124. A tight fit, interference fit, press fit etc. of seal 100 can help ensure that injected plastic material freezes off (e.g. sets) before contacting and damaging the o-rings. In embodiments where internal gap sub seal 100 deforms during installation into gap sub 120, seal 100 may be able to expand to fill gaps created when gap sub 120 is subject to deformation, bending or torqueing.

In some embodiments, internal gap sub seal 100 engages female member 122 such that internal bore 122D of female member 122 aligns with internal bore 108 of internal gap sub seal 100 to create a continuous internal bore in which fluid may flow. Lip 102 and first internal shoulder 104A may aid in aligning internal seal 100. In some embodiments, the internal diameter of internal bore 108 is approximately equal to the internal diameter of internal bore 122D. This may allow for smoother flow of fluid though the bore of the gap sub and may prevent unnecessary wear on internal gap sub seal 100. Cavity 122B, protrusion 122E and shoulder 122F of female member 122 may improve the seal between internal gap sub seal 100 and female member 122. In particular, such features increase the length of the path that fluid would need to travel to penetrate past internal gap sub seal 100. Such features may also aid in keeping internal seal 100 in place during deformation of gap sub 120.

In some embodiments, internal gap sub seal 100 and/or female member 122 comprises one or more O-rings to prevent the ingress of fluid or other undesired substances into gap 123 between male member 124 and female member 122, into collar 140 or into the internal bore of gap sub 120. In some embodiments, an external O-ring 106B is provided between outer surface 110D of internal gap sub seal 100 and internal wall 122C of female member 122. In some embodiments, a groove 122G is provided in female member 122 for receiving external O-ring 106B. Groove 122G may have sufficient width to snugly receive O-ring 106B and sufficient depth to allow O-ring 106B to protrude from groove 122G to thereby seal the interface between internal gap sub seal 100 and internal wall 122C.

In embodiments where an O-ring is provided to seal against a seal (such as gap sub seal 100 or seal 150) it is generally desirable to provide a smooth surface finish (e.g. a 32 Ra surface finish or smoother) on the portions of seal 100 and/or seal 150 and/or female member 122 and/or male member 124 contacted by the O-rings.

After internal gap sub seal 100 is installed in female member 122, male member 124 may be engaged with internal gap sub seal 100 and female member 122. As depicted in FIGS. 3 and 4, end 124A of male member 124 may engage the second internal shoulder (not depicted), internal surface 110C may optionally engage external wall 124C of male member 124 and shoulder 124B of male member 124 may engage second edge 110B.

In some embodiments, internal gap sub seal 100 engages male member 124 such that internal bore 124D of male member 124 aligns with internal bore 108 of internal gap sub seal 100 to create a continuous internal bore in which fluid may flow. In some embodiments, the internal diameter of internal bore 108 is approximately equal to the internal diameter of internal bore 124D. This may allow for smoother flow of fluid though the bore of the gap sub and may prevent unnecessary wear on internal gap sub seal 100. Embodiments in which the internal diameter of internal bore 108 is approximately equal to the internal diameter of internal bore 124D are advantageous in cases where it is desirable to provide a sleeve (not shown) lining internal bores 108 and 124D.

In some embodiments, internal gap sub seal 100 and/or male member 124 comprises one or more O-rings to prevent the ingress of fluid or other undesired substances into the gap between male member 124 and female member 122 or into collar 140. In some embodiments, an internal O-ring 106A is provided between inner surface 110C of internal gap sub seal 100 and external wall 124C of male member 124. In some embodiments, a groove 124E is provided in male member 124 for receiving internal O-ring 106A. Groove 124E may be have sufficient width to snugly receive O-ring 106A and sufficient depth to allow O-ring 106A to protrude from groove 124E to thereby seal the interface between internal gap sub seal 100 and external wall 124C. O-rings 106A and 106B may provide a consistent seal between internal gap sub seal 100, male member 124 and female member 122 despite bending of gap sub 120. In the illustrated embodiment, backup rings are provided on one or both sides of the O-rings. The backup rings are preferably provided at least on the side of the O-rings that contact the injected material. The backup rings can protect the O-rings from being damaged by contact with the injected material and can also help to avoid extrusion of the O-rings under high pressures. The backup rings may further function to prevent disengagement of sealing surfaces of the O-rings in the event that there is any deflection of male member 124 relative to female member 122.

In some embodiments, outwardly protruding lip 102 and the rest of internal gap sub seal 100 provides the additional benefit of protecting internal O-ring 106A and external O-ring 106B from polymer that is injected into gap 123 between female member 122 and male member 124 after they are securely mated together. In this way, O-rings 106A, 106B can be made from an elastic material having better sealing characteristics (along with a lower melting temperature) without risk of being melted or damaged by the injected polymer and rendered ineffective.

In some embodiments, internal gap sub seal 100 is installed on male member 124 before male member 124 is inserted into female member 122 such as depicted in FIG. 2.

The arrangement of O-rings 106A, 106B helps to prevent internal gap seal 100 from bowing or collapsing into the bore 108 of gap sub 120 as a result of pressures exerted during injection. In particular, aligning O-rings 106A, 106B radially on the same plane (i.e. a plane orthogonal to the longitudinal direction of the drill string) may prevent differential pressure across gap sub seal 150 that could result in bowing, collapsing, or deflection of gap sub 120. Additionally, this alignment of O-rings 106A, 106B may improve the ability of the gap sub 120 to handle bending since O-rings 106A, 106B are on the same bending plane and therefore do not disengage under bending stress.

Another aspect of the invention provides an external gap sub seal for electrically isolating a male member of a gap sub from a female member of the gap sub, preventing drilling fluid or sealing members, such as injected polymer, from breaching the insulating gap between the male member and the female member from outside the gap sub. In some embodiments, an external gap sub seal may be employed in combination with an internal gap sub seal to thereby seal the insulating gap from internal drilling fluid and external drilling fluid.

Figure 6:
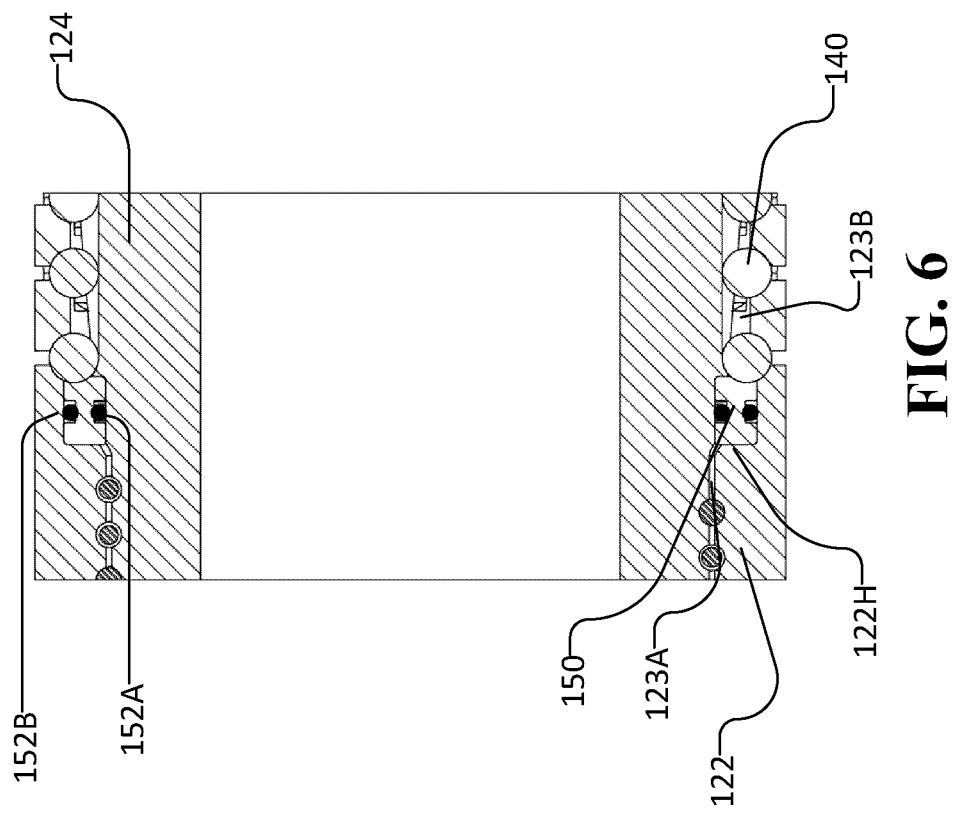
FIG. 6 is a magnified view of another portion of an assembled gap sub according to the embodiment of FIG. 3.
Figure 7:
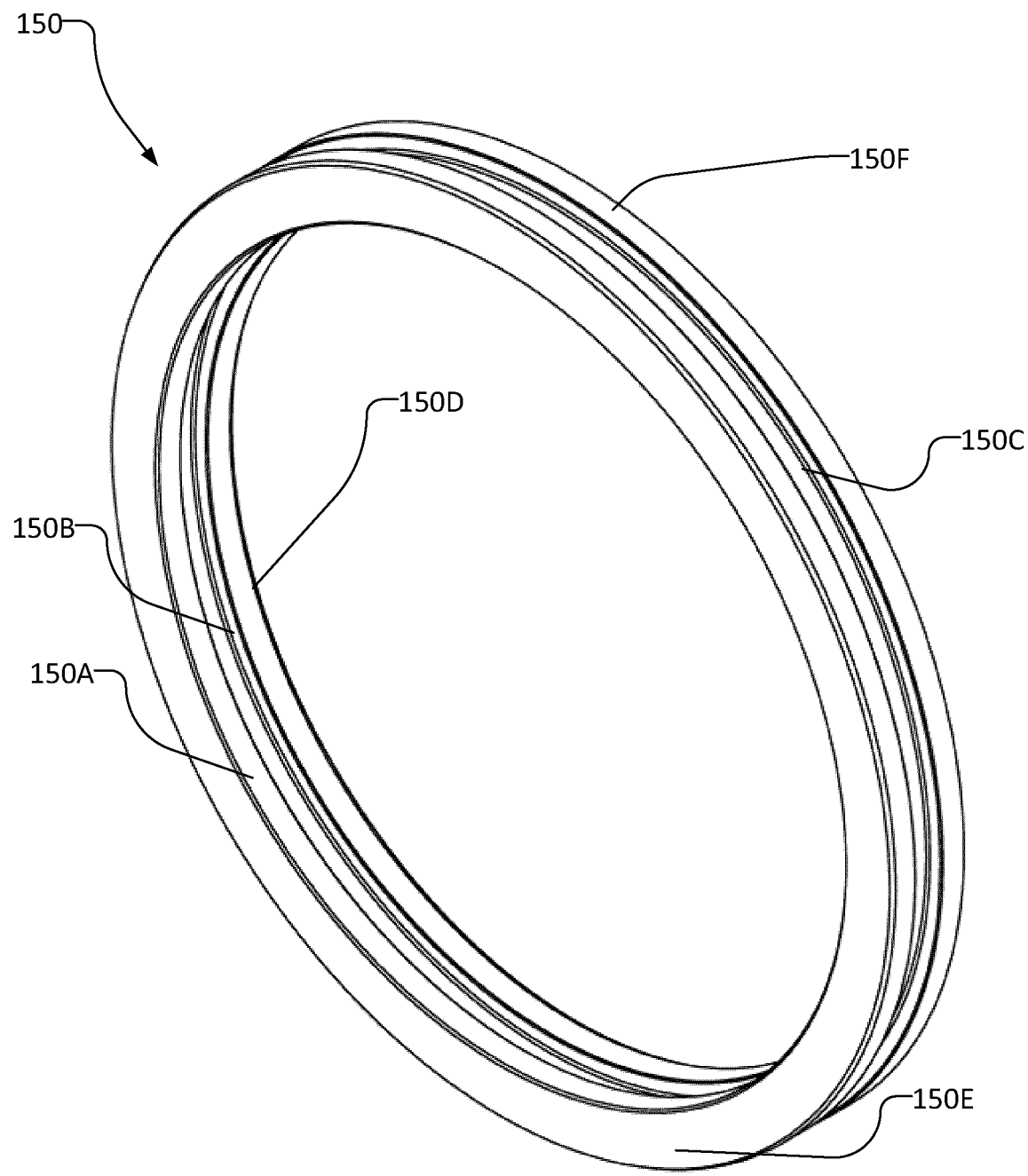
FIG. 7 is an isometric view of an external gap sub seal according to one embodiment.

FIG. 7 depicts one example embodiment of an external gap sub seal 150. The example external gap sub seal 150 comprises a tubular body 150A having an internal groove 150B and an external groove 150C formed therein and a flange 150D extending from the first side 150E thereof. In some embodiments, the second side 150F may have one or more grooves or indents for abutting one or more insulating bodies such as are depicted in FIGS. 3 and 6.

External gap sub seal 150 may be made from any of the same range of materials described above in relation to seal 100.

As illustrated in FIGS. 2, 3 and 6, external gap sub seal 150 may installed within opening 122A of female member 122 such that the first side 150E of external gap sub seal 150 engages ledge 122H (see FIG. 6) of female member 122 and flange 150D engages part of internal wall 122C.

In some embodiments, the engagement of external gap sub seal 150 with female member 122 is an interference fit. In other embodiments, the engagement of external gap sub seal 150 with female member 122 is a snap-fit, a clearance fit, a resilient deformation fit, a friction fit, a threaded fit or another suitable type of fit. A tight fit may serve to improve the seal between female member 122, external gap sub seal 150 and male member 124. A tight fit can advantageously block injected material from reaching and damaging O-rings (e.g. 152A and 152B) or other sealing structures that could otherwise be damaged by the injected material. In embodiments where external gap sub seal 150 deforms during installation into gap sub 120, seal 150 may be able to expand to fill gaps created when gap sub 120 is subject to deformation, bending or torqueing.

Additional seals may be provided between gap sub seal 150 and male and female members 124, 122. These additional seals may conveniently be in the form of O-rings. The O-rings may be located in grooves formed in gap sub seal 150 and/or in male and/or female member 124, 122. For example, in some embodiments O-rings are received in grooves in male member 124 and in female member 122. The O-rings may protrude from the grooves to seal against gap sub seal 150.

in other example embodiments, internal groove 150B may receive an internal O-ring 152A and external groove 150C may receive an external O-ring 152B. Internal groove 150B may have a width sufficient to snugly engage internal O-ring 152A and a depth sufficient to cause internal O-ring 152A to protrude out of internal groove 150B for the purpose of sealing the gap between male member 124 and external gap sub seal 150. Likewise, external groove 150C may have a width sufficient to snugly engage external O-ring 152B and a depth sufficient to cause external O-ring 152B to protrude out of external groove 150C for the purpose of sealing the gap between female member 122 and external gap sub seal 150. In this way, external gap sub seal 150 may seal the gap between female member 122 and male member 124.

In some embodiments, external gap sub seal 150 provides the additional benefit of protecting internal O-ring 152A and external O-ring 152B from hot molten polymer that is injected into the gap between female member 122 and male member 124 after they are securely mated together. In this way, O-rings 152A, 152B can be made from an elastic material having a lower melting temperature with less risk of being melted by the injected polymer and rendered ineffective.

After external gap sub seal 150 is installed in female member 122, male member 124 may be engaged with external gap sub seal 150 and female member 122. As depicted in FIGS. 3 and 6, external wall 124C of male member 124 may engage the outward facing face of external gap sub seal 150 and the edges of external groove 150C.

In some embodiments, gap sub 120 comprises both internal gap sub seal 100 and external gap sub seal 150, such as depicted in FIGS. 3 and 6. In such embodiments, internal gap sub seal 100 and external gap sub seal 150 function together to seal the mating portions of female member 122 and male member 124 (i.e. insulating gap 123). After male member 124 is inserted into female member 122, a material such as a polymer may be injected into gap 123 between the mating portions of female member 122 and male member 124. The polymer sets to become a solid material after it is injected. Internal gap sub seal 100 and external gap sub seal 150 may serve to prevent any such injected material from leaking into the bore of gap sub 120.

In some embodiments, one or both of internal gap sub seal 100 and external gap sub seal 150 may be installed on male member 124 before male member 124 is mated to female member 122, such as depicted in FIG. 2.

In some embodiments two or more different dielectric materials are injected into different regions of a gap sub. For example different materials may be injected on either side of seal 150. The physical characteristics of these materials may be different. For example, in volume 123A (on the left hand side of seal 150 as shown in FIG. 6) a first injected material may have a high flowability to assist the material to flow around spacer elements (such as for example spheres 326D) located in volume 123A. The material injected into volume 123A may additionally have a high stiffness, when set so as to minimize relative motion between male and female parts 124, 122.

A second material may be injected into volume 123B (to the right of seal 150 in FIG. 6). The second material may be selected to provide high resistance to erosion as well as resistance to downhole fluids. The first injected material may not need to provide the same degree of resistance to erosion and downhole fluids as the second material because the first injected material is not directly exposed to flowing downhole fluids as is the second injected material.

In some embodiments, separating features are provided in gap 123 to create discrete volumes for injection of material(s). Different discrete volumes may be injected with different materials (e.g. different polymers). For example, a first discrete volume may have a complex shape and be injected with a material having a high flowability while a second discrete volume may have a more simple geometry and may be injected with a material having a lower flowability but higher stiffness.

In some embodiments, a dielectric fluid such as dielectric oil is used to fill gap 123 between inner and outer seals 100 and 150.

Another aspect of this invention provides another external gap sub seal for electrically isolating a male member of a gap sub from a female member of the gap sub, preventing internal drilling fluid from breaching an insulating gap between the male member and the female member and preventing external drilling fluid from breaching the internal bore or preventing sealing members such as ceramic balls or injected polymer from breaching the internal bore.

Figure 9:
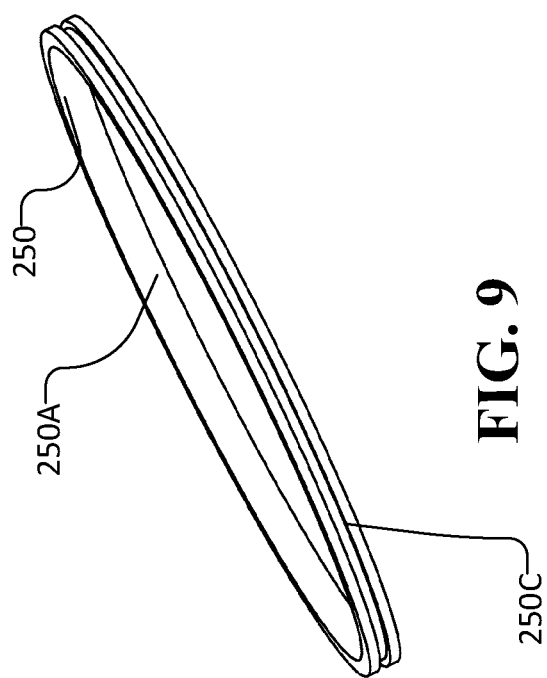
FIG. 9 is an isometric view of an external gap sub seal according to another embodiment.

External gap sub seal 250 is generally similar to external gap sub seal 150 described elsewhere herein. External gap sub seal 250 differs primarily from external gap sub seal 150 in cross-sectional shape and its interaction with O-rings 252, as depicted in FIGS. 8 through 10.

External gap sub seal 250 may be installed on female member 222 before being mated with male member 224, although this is not mandatory. In particular, external groove 250C may engage protrusion 222I on female member 222.

In some embodiments, two or more external gap seals 250 may be provided to prevent fluid influx in gap 123 between female member 122 and male member 124 from collar 240. In some such embodiments, an external gap sub seal 250 may be provided on either side of an O-ring 252, as depicted in FIG. 8. In this way, O-ring 252 is protected from polymer injected into collar 240 and polymer injected into the gap 223 between male member 224 and female member 222.

In some embodiments, the engagement of external gap sub seal 250 with female member 222 is an interference fit. An interference in the range of 0.001 inches to 0.005 inches (about 0.025 mm to 0.125 mm) is typical. In other embodiments, the engagement of external gap sub seal 250 with female member 222 is a snap-fit, a resilient deformation fit, a friction fit, a threaded fit or another suitable type of fit. A tight fit may serve to improve the seal between female member 222, external gap sub seal 250 and male member 224. In embodiments where external gap sub seal 250 deforms during installation into gap sub 220, seal 250 may be able to expand to fill gaps created when gap sub 220 is subject to deformation, bending or torqueing.

External gap sub seal 250 may be made, for example, from any of the same range of materials described herein for seals 100 and 150.

In some embodiments, gap sub seal 250 has a "U" shaped cross section such that external groove 250C receives protrusion 222I, as depicted in FIG. 9. In such embodiments, external gap sub seal 250 may be installed on female portion 222 by deforming external gap sub seal 250 and allowing restorative forces to return external gap sub seal 250 to its original shape in engagement with protrusion 222I. In other embodiments, external gap sub seal 250 may be cooled so as to contract before being installed on to protrusion 222I. In some embodiments, female member 222 is allowed to expand to better allow external gap sub seal 250 to be installed. In alternative embodiments, external gap sub seal 250 may be split in two to better allow external gap sub seal 250 to be installed.

Figure 10B:
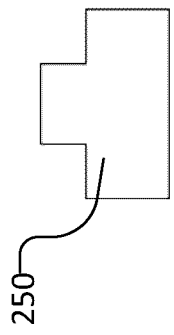
FIG. 10B is a cross-sectional view of a portion of an external gap sub seal according to another embodiment.
Figure 10A:
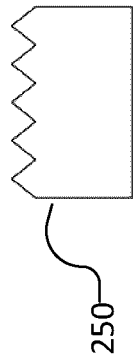
FIG. 10A is a cross-sectional view of a portion of an external gap sub seal according to another embodiment.

In other embodiments, the cross-sectional shape of external gap sub seal 250 may be different. For example, FIGS. 10A and 10B depict various possible cross-sections for an external gap sub seal 250. In embodiments where the cross-section of external gap sub seal 250 is different, at least female member 222 and possibly male member 124 may have interlocking or conforming geometry for receiving gap sub seal 250 so as to provide a tight fit as described above.

Figure 11A:
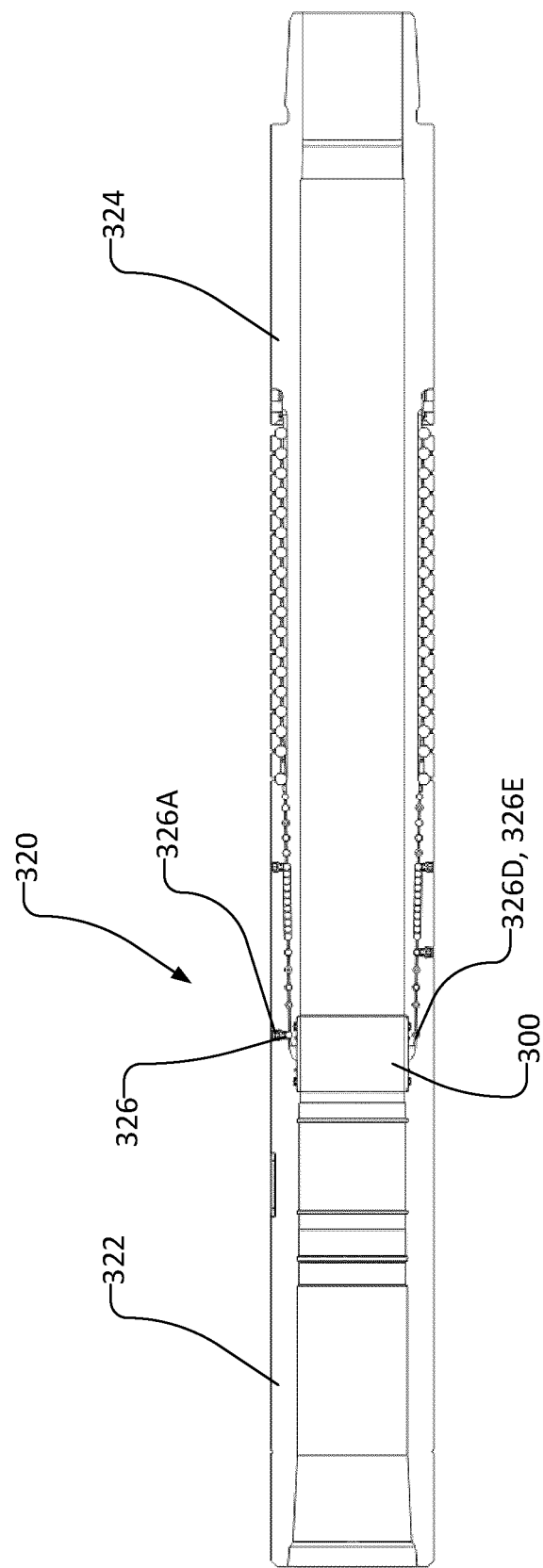
FIG. 11A is a cross-section of an assembled gap sub according to another embodiment.
Figure 11B:
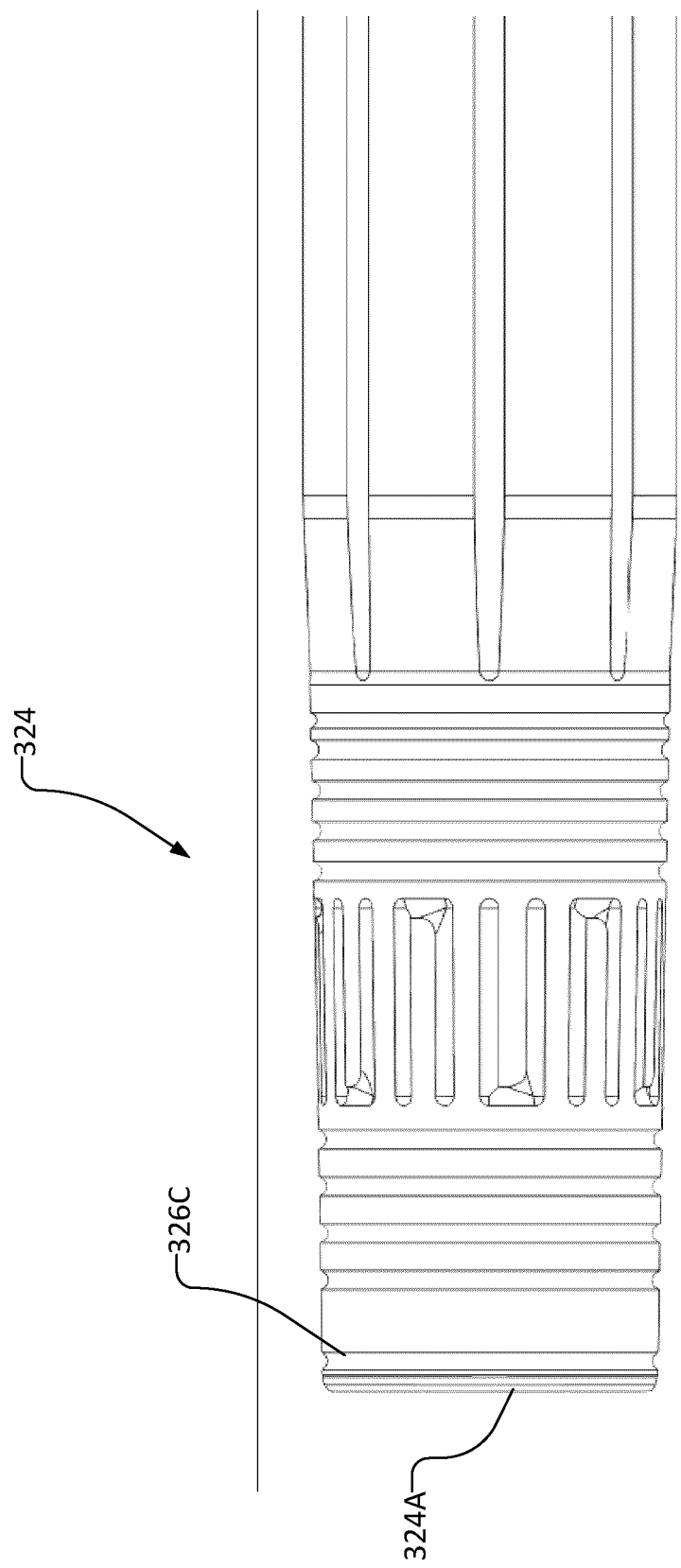
FIG. 11B is a cross section of a male member of a gap sub according to the embodiment of FIG. 11A.
Figure 11C:
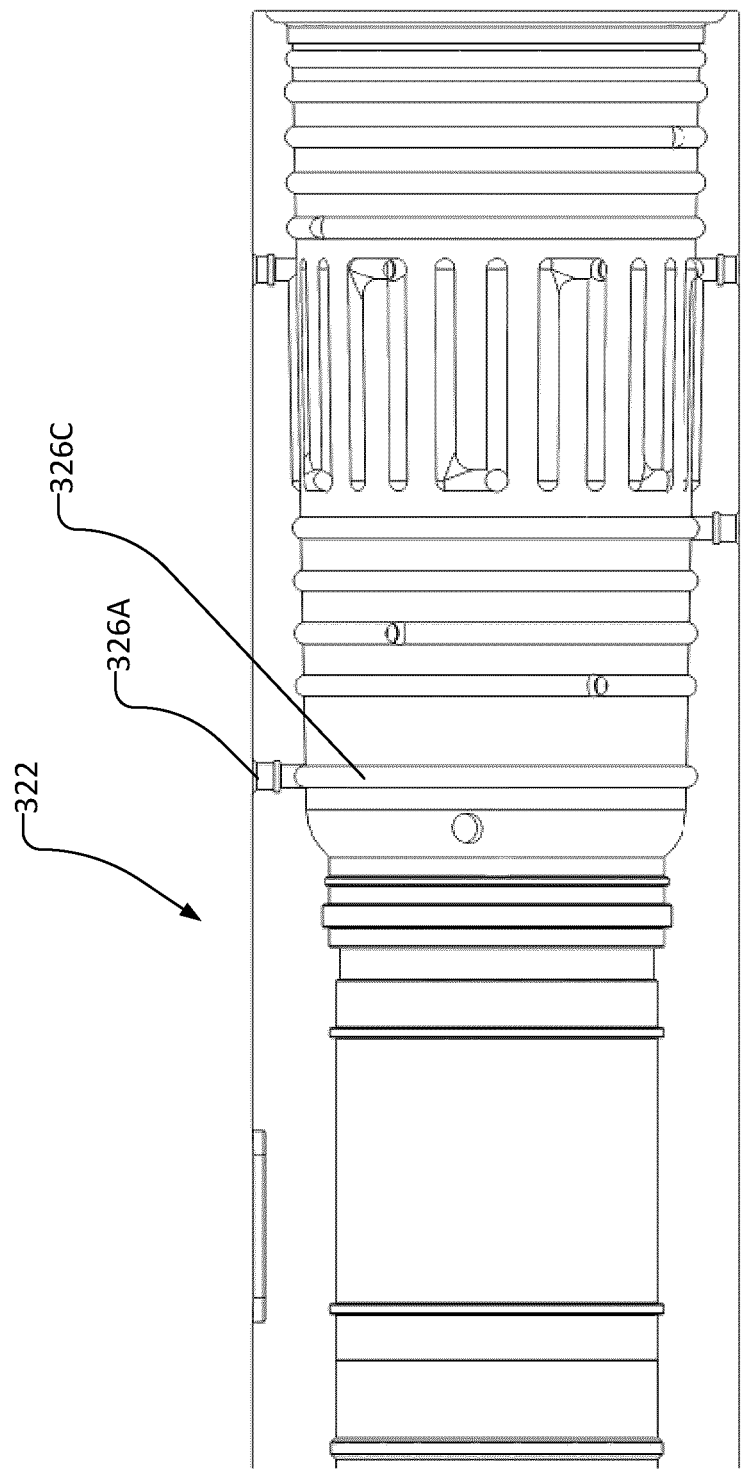
FIG. 11C is a cross section of a female member of a gap sub according to the embodiment of FIG. 11A.

Another aspect of this invention provides a gap sub 320 having a male member tip support 326 as depicted in FIGS. 11A to 11C. Gap sub 320 may be similar to gap sub 20, 120 or any other gap sub described herein except that gap sub 320 includes male member tip support 326. Male member tip support 326 may ensure that the tip 324A of male member 324 is supported fully and moves with female member 320 even when gap sub assembly 320 is subject to bending forces. In this way, internal gap sub seal 300 remains in sealing contact with both male member 324 and female member 322 even when gap sub assembly 320 is subject to deformation or bending forces. Male member tip support may be particularly beneficial when torsional channels for securing male member 324 to female member 322 do not extend to the vicinity of tip 324A of male member 324.

Male member tip support 326 may comprise one or more openings 326A, one or more female member grooves 326B, one or more corresponding male member grooves 326C and one or more discrete bodies (e.g. spheres) 326D as depicted in FIG. 11A. Male member grooves 326C may be located near an end of male member 324 as depicted in FIG. 11B. Similarly female member grooves 326B of female member 322 may be located near an internal end of the opening of female member 322 as depicted in FIG. 11C. Female member grooves 326B may be deeper than male member grooves 326C so as not to remove excess material from male member 324.

When male member 324 is inserted into female member 322, male member grooves 326C may align with female member grooves 326B to form a channel 326E. In some embodiments, channel 326E is a circumferential channel that wraps around an internal portion of gap sub 320. In some embodiments, there is a plurality of channels 326E. By inserting insulating bodies into openings 326A tip 324A of male member 324 may be secured within the opening of female member 322. The insulating bodies may comprise spheres 326D or bodies of other shapes such as pins, cubes, cylinders or the like dimensioned to fit into channel 326E. After inserting the desired number of spheres 326D, each opening 326A may be plugged using a fill plug in order to avoid ingress of fluids into the insulating gap of gap sub 320.

Spheres 326D can have any suitable diameter. Typically, all spheres 326D are of the same size, although this is not strictly necessary. Spheres 326D may be sized and shaped to correspond with the cross-sectional shapes of channel 326E. The size of spheres 326D may be based at least in part on one or more of the cost of spheres 326D, the strength of spheres 326D, the size of the gap sub and the potential presence of defects in spheres 326D.

If spheres 326D are made of a metal or metal alloy, an additional electrically-insulating barrier such as a coating or material, such as a ceramic, on sphere 326D may be provided to aid in electrically isolating male part 324 from female part 322.

In some embodiments, polymer is injected into channel 326E after spheres 326D are installed to better secure male member 324 to female member 322 and to improve the electrical insulation between male member 324 and female member 322.

In some embodiments, a male member tip support may be provided that secures the tip of male member within the female member using an alternative securing mechanism. For example, various interlocking geometries may be employed. In some embodiments pegs, screws or other suitable means are employed to secure the tip of the male member within the female member. Polymer or a dielectric fluid such as dielectric oil may be injected to seal the space between the male member and the female member.

A number of the embodiments described herein provide a construction in which an injected material such as a suitable polymer fills a space that is bounded in part by a seal. In some such embodiments the seal has an affinity for the injected material such that the injected material tends to adhere to the seal. Such an affinity may be provided by appropriate selection of a material for the seal and the injected material and/or appropriate surface treatment of the seal. For example, the material of the seal may be selected such that the injected material tends to wet and/or adhere to the seal under the conditions in which the injected material is injected. In another embodiment a face of the seal that contacts the injected material may be coated and/or treated with a bonding agent. The material of the seal may be selected such that a chemical reaction (e.g. a vulcanization reaction) provides cross-links that chemically bond the injected material to a face of the seal.

FIG. 12 schematically illustrates a further alternative external seal 450 comprising a sealing ring 451. Sealing ring 451 is made of and/or coated with an electrically-insulating material. A seal like seal 450 comprising a sealing ring 451 may be applied on its own or in combination with other structures including those other structures that are defined elsewhere herein.

In the embodiment illustrated in FIG. 12, an electrically conductive male part 452 is coupled to an electrically conductive female part 454. Male part 452 and female part 454 do not touch one another and are mechanically fixed together by means of electrically-insulating bodies 456 (spherical bodies are illustrated) that are located in a gap 455 between male part 452 and female part 454 and span between grooves or other indentations in male part 452 and female part 454. Gap 455 is filled with an electrically-insulating material such as a suitable polymer or other injected material that fills gap 455 around bodies 456.

Sealing ring 451 is located between an external gap 458 and female part 454. Sealing ring 451 helps to prevent ingress of fluid into gap 455 even if external gap 458 becomes compromised so that fluid enters external gap 458.

Sealing ring 451 has a cross section that includes one or more sealing features. In the illustrated embodiment sealing ring 451 is generally L-shaped in cross-section. A first sealing feature is provided by a part 451A that extends axially into the end of gap 455. In the illustrated embodiment a second sealing feature is that part 451A is grooved to receive one or more O-rings 460 that seal against female part 454 and/or male part 452. The illustrated embodiment includes two O-rings 460 that seal against each of male part 452 and female part 454.

A third sealing features relates to the configuration of the part 451B of sealing ring 451 that extends circumferentially between external gap 458 and female part 454. In the illustrated embodiment, part 451B extends between tapered faces of a ring 464 and female part 454. Part 451B is tapered to match the facing profiles of ring 464 and female part 454. Ring 464 may be one of a plurality of rings that is supported in external gap 458. The illustrated embodiment includes two rings 465 in addition to ring 464. Ring 464 together with additional rings 465, if present helps to protect the material 466 that fills external gap 458 around rings 464, 465. Electrically-insulating bodies (not shown in FIG. 12) may be provided between rings 464, 465 and/or between rings 464 and/or 465 and male part 452. Material 466 may comprise a suitable electrically insulating material such as a polymer, a ceramic or the like.

Providing a sealing ring 451 that has a tapered face 451C that bears against a corresponding tapered face of female part 454 provides an extended contact between sealing ring 451 and female part 454 that can reduce the likelihood of fluid ingress into gap 455.

A fourth sealing feature is provided by part 451B of sealing ring 451 being shaped to receive annular projections from sealing surfaces of ring 464 and/or female part 454. In the illustrated embodiment an annular projection 464A from ring 464 is engaged in a corresponding recess in part 451B of sealing ring 451. The annular portions comprise sharp-edged annular ridges in some embodiments.

Alternative embodiments provide sealing rings 451 configured to provide sub combinations of the sealing features described above.

Another feature of the embodiment illustrated in FIG. 12 is that some or all of protective rings 464, 465 have oppositely-inclined edge faces.

In some embodiments, it may be desirable to have an internal gap sub seal (e.g. similar to gap sub seal 100) that may be installed, replaced and/or re-installed after mating a male member of a gap sub with a female member of the gap sub or without separating a male member of a gap sub from a female member of the gap sub.

Figure 13:
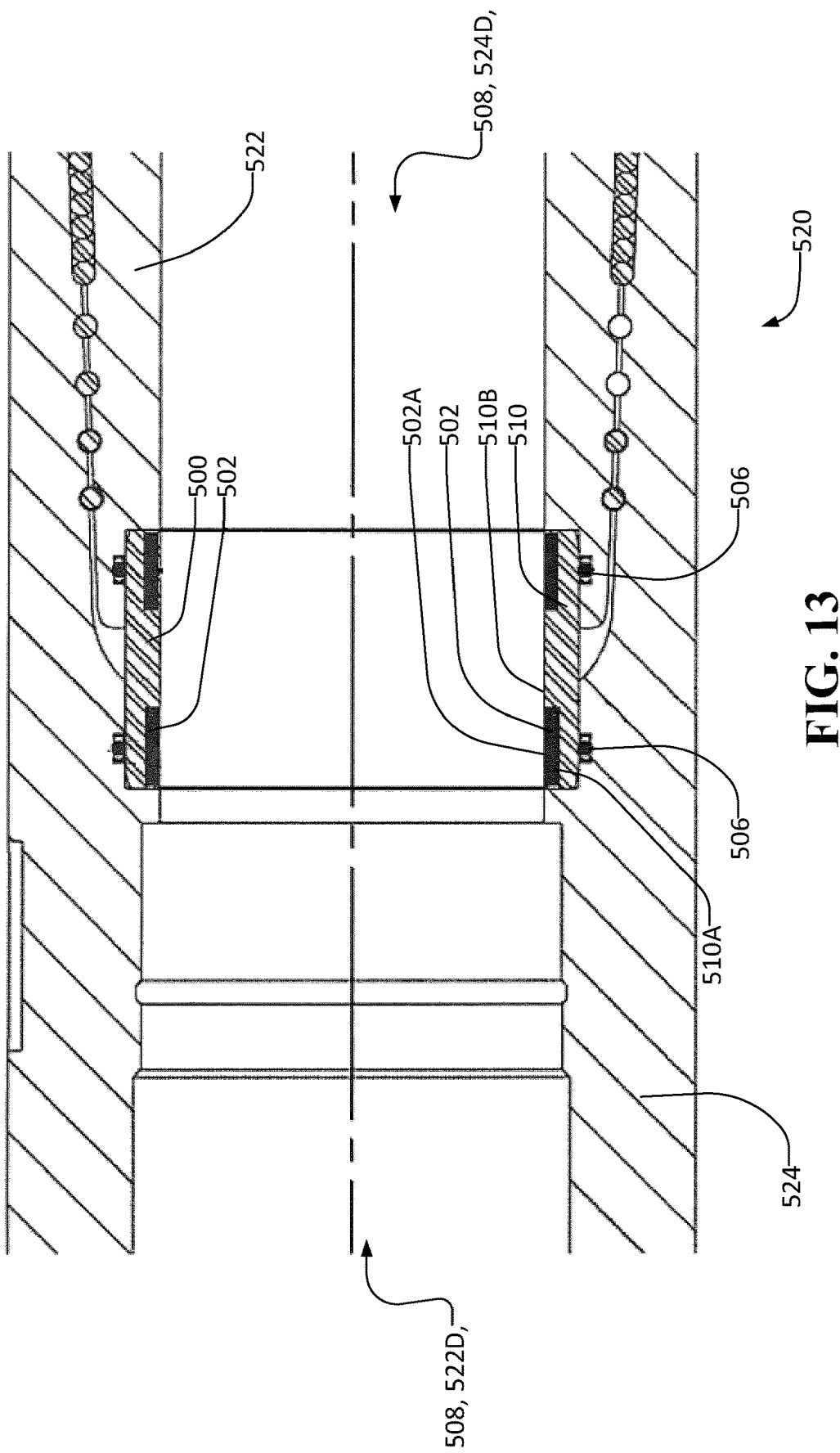
FIG. 13 is a cross section through a gap sub according to another example embodiment.

FIG. 13 schematically illustrates an internal gap sub seal 500 that may be installed, replaced and/or re-installed in gap sub 520 without separating male member 524 from female member 520 or after male member 524 is mated to female member 522. Internal gap sub seal 500 may be generally similar to internal gap sub seal 100 except as described herein.

Internal gap sub seal 500 comprises a generally tubular sleeve 510 and one or more outer O-rings 506. Outer O-rings 506 may be similar to O-rings 106A, 106B, for example.

Tubular sleeve 510 may be complementary in shape to a recess or groove in one or both of male member 524 and female member 522. In other embodiments, the engagement of tubular sleeve 510 with female member 522 and/or male member 524 is a press fit, a snap-fit, a resilient deformation fit, a friction fit, a threaded fit, a clearance fit or another suitable type of fit. A tight fit may serve to improve the seal between female member 522, tubular sleeve 510 and male member 524.

In some embodiments, internal gap sub seal 500 engages female member 522 and/or male member 524 such that internal bore 522D of female member 522 (and/or internal bore 524D of male member 524) aligns with internal bore 508 of internal gap sub seal 500 to create a continuous internal bore in which fluid may flow. Tubular sleeve 510 may comprise one or more channels 510A for receiving retainers 502 such that an internal surface 502A of each retainer 502 is flush or near flush with an internal surface 510B of tubular sleeve 510, as is depicted in FIG. 13.

Tubular sleeve 510 may be made of suitable thermoplastics, elastomeric polymers, rubber, and other non-conductive materials. For example tubular sleeve 510 may be made from a suitable grade of PEEK (Polyetheretherketone), PET (Polyethylene terephthalate) or PPS (Polyphenylene sulfide) polymer. Where tubular sleeve 510 is made of polymer, the polymer may be reinforced or fiber-filled (e.g. with glass fibers) for enhanced erosion resistance, structural stability and strength.

Internal gap sub seal 500 may be held in place at least in part by one or more retainers 502. Retainers 502 may comprise any suitable retainers. Retainers 502 may help to prevent tubular sleeve 510 from bowing or collapsing into the bore 508 of gap sub 520 as a result of pressures exerted during injection or otherwise. For example, retainers 502 may comprise a spring that may be compressed radially inward to remove force exerted radially outward on tubular sleeve 510 and which is naturally biased to expand and exert force radially outward on tubular sleeve 510 to hold tubular sleeve 510 in place relative to male member 524 and female member 522. In some embodiments, retainer 502 comprises a generally circular spring having first and second ends that overlap (or increasingly overlap) when the spring is compressed. In some embodiments, retainer 502 comprises a generally circular spring having first and second ends that are spaced apart when the spring is in an extended state (i.e. when it exerts force radially outwardly on tubular sleeve 510) and as the spring is compressed, the ends are forced closer together. In some embodiments, retainers 502 are not springs.

When retainers 502 are removed or released, it may be possible to remove tubular sleeve 510 from gap sub 520. Removing tubular sleeve 510 may comprise deforming at least a portion of tubular sleeve 510 to remove it from a groove or channel of one or both of female member 522 and male member 524. To ease installation and removal of tubular sleeve 510, tubular sleeve 510 may be shaped without any features that interlock with male or female members 524, 522 such as shoulders or lips (although this is not mandatory).

A number of the embodiments described herein provide a construction in which an injected material such as a suitable polymer fills a space that is bounded in part by a seal. In some embodiments, an opening in the gap sub is provided adjacent or near to the seal to allow excess, air, gas, fluid and/or injected material to escape the gap sub as the injected material is injected into the gap sub. In some embodiments, there may be a concern that instead of being directed toward such an opening, the injected material may instead apply force against the seal so as to damage the seal, unseat the seal or otherwise reduce the efficacy of the seal. To reduce the possibility of the injected material damaging, unseating or otherwise reducing the efficacy of the seal, a ramp may be provided to encourage the injected material to flow toward the opening rather than apply pressure on the seal. In some embodiments, the ramp is part of the seal, co-molded with the seal and/or bonded to the seal. In some embodiments, the ramp is part of an additional ring or sleeve that is position between the seal and the gap in which the injected material is injected.

Figure 14A:
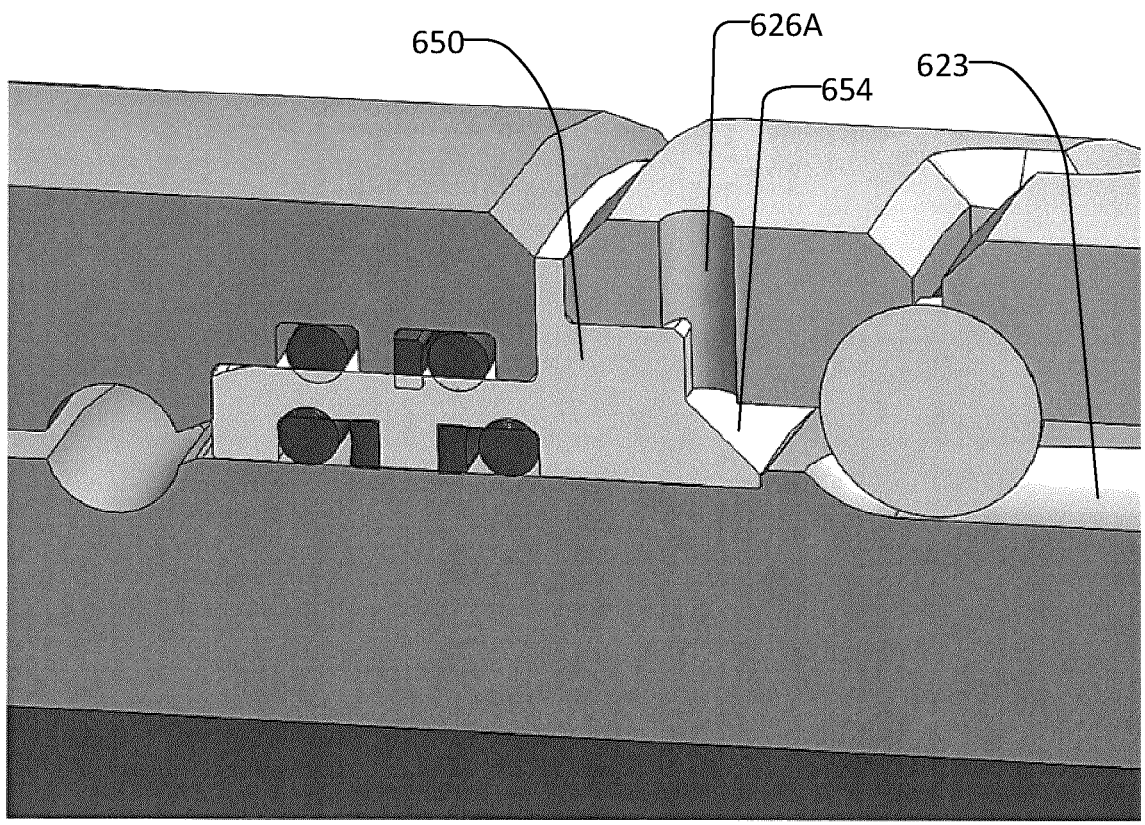
FIG. 14A is a cross-sectional view of a portion of a gap sub according to another example embodiment.

FIG. 14A schematically illustrates a portion of a gap sub 620 according to one embodiment of the invention. Gap sub 620 may be substantially similar to any gap subs described herein (e.g. gap sub 120, 220, 320 etc.). Gap sub 620 comprises a gap 623. Gap 623 may be substantially similar to gap 123, although this is not mandatory. As can be seen from FIG. 14A, gap 623 is at least partially bounded by an external gab sub seal 650. An opening 626A in gap sub 620 may be provided in fluid communication with gap 623 to allow injected material, previously trapped fluids or gases, or the like to escape from gap 623 during injection. Opening 626A may subsequently be plugged, as desired. To encourage injected material or the like away from external gap sub seal 650 and toward opening 626A, gap sub seal 650 may comprise a ramp 654. Ramp 654 may be generally straight or linear or may be curved. Ramp 654 may be located on external gap sub seal 650 such that ramp 654 forms at least a portion of a boundary of gap 623. Although only external gap sub seal 650 is depicted as including a ramp 654, it should be understood that any of the external gap sub seals discussed herein (e.g. external gap sub seal 150, 250 etc.) and/or any of the internal gap sub seals (100, 200, 300, etc.) may comprise a ramp similar to ramp 654.

Figure 14B:
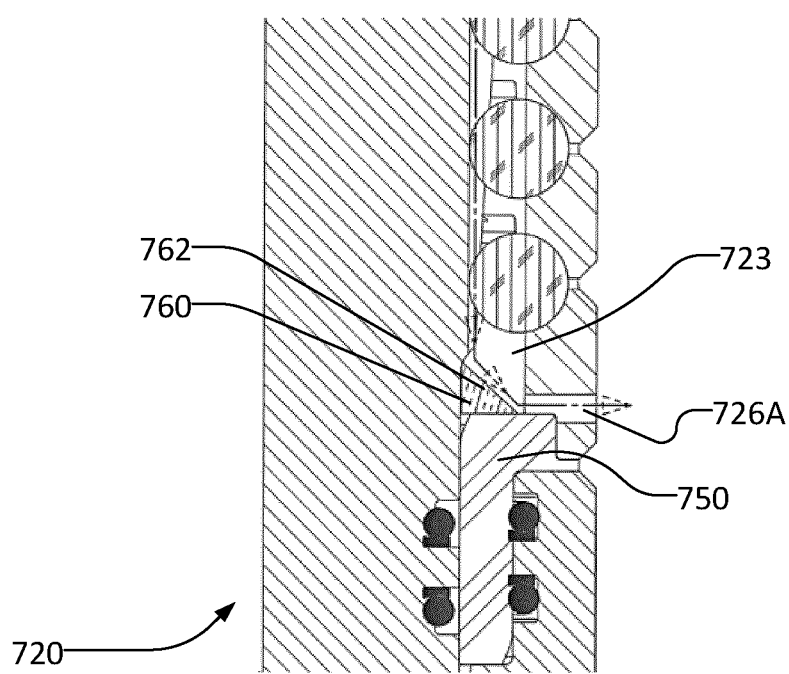
FIG. 14B is a cross-sectional view of a portion of a gap sub according to another example embodiment.

Alternatively, in some embodiments, a ramp is provided separately from an internal or external gap sub seal. For example, FIG. 14B schematically illustrates a portion of a gap sub 720. Gap sub 720 may be substantially similar to any gap subs described herein (e.g. gap sub 120, 220, 320 etc.). Gap sub 720 comprises a gap 723. Gap 723 may be substantially similar to gap 123, although this is not mandatory. As can be seen from FIG. 14B, gap 723 is at least partially bounded by an external gab sub seal 750. An opening 726A in gap sub 720 may be provided in fluid communication with gap 723 to allow injected material or the like to escape from gap 723 during injection. To encourage injected material or the like away from external gap sub seal 750 and toward opening 726A, a ramp ring 760. Ramp ring 760 may be located adjacent external gap sub seal 750 such that a ramp 762 of ramp ring 760 forms at least a portion of a boundary of gap 623. In some embodiments, ramp ring 760 comprises a different material than external gap sub seal 750. For example, ramp ring 760 may comprise a more durable or robust material such as ceramic or a polymer such as PTFE which may better withstand the pressure and/or temperature of the injected material. Although only gap sub 720 is depicted as including a ramp ring 760, it should be understood that any of the gap subs discussed herein (e.g. gap subs 100, 200 etc.) may comprise a ramp ring similar to ramp ring 760.

It can be appreciated by those skilled in the art that at least some of the embodiments described herein provide one or more of the following advantages:
- Improved resilience for preventing fluid ingress between the male and female members;
- Improved redundancy for preventing fluid ingress between the male and female members;
- Improved maintenance of seal for preventing fluid ingress between the male and female members while a gap sub is subject to bending forces;
- Improved gap sub reliability;
- Ability to inject multiple types of dielectric material for sealing a gap sub; and
- Improved ability to prevent ingress of fluid between the male and female members.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to".
- "connected", "coupled", or any variant thereof, means any connection or coupling, either direct or indirect, between two or more elements; the coupling or connection between the elements can be physical, logical, or a combination thereof.
- "herein", "above", "below", and words of similar import, when used to describe this specification shall refer to this specification as a whole and not to any particular portions of this specification.
- "or", in reference to a list of two or more items, covers all of the following interpretations of the word: any of the items in the list, all of the items in the list, and any combination of the items in the list.
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A gap sub comprising:
a male member;
a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:
   a first section having a first internal diameter approximately equal to the external diameter of the tip of the male member; and
   a second section, defining an internal bore of the first seal, having an internal diameter approximately equal to an internal diameter of the bore of the male member and an internal diameter of the bore of the female member; and
wherein:
   the first section of the first seal engages the tip of the male member; and
   the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;
wherein the tip of the male member engages a first internal shoulder formed into the internal bore of the first seal.

2. A gap sub according to claim 1 comprising one or more first O-rings between the first seal and at least one of: the male member and the female member.

3. A gap sub according to claim 2 wherein each of the one or more first O-rings are received in one or more grooves on the male member or the female member.

4. A gap sub according to claim 1 comprising a first external O-ring compressed in a first external channel defined at least in part by a groove on the female member and an external surface of the first seal and a first internal O-ring compressed in a first internal channel defined at least in part by a groove on the male member and an internal surface of the first seal.

5. A gap sub according to claim 4 wherein the first external O-ring and the first internal O-ring each lie in a plane orthogonal to a longitudinal direction of the gap sub.

6. A gap sub according to claim 1 wherein the first seal comprises a third section having an internal diameter approximately equal to an internal diameter of a cavity within the opening of the female member and the cavity receives the third section of the first seal.

7. A gap sub according to claim 6 wherein a fit between the cavity of the female member and the third section of the first seal is an interference fit.

8. A gap sub according to claim 1 wherein a fit between the first section of the first seal and the tip of the male member is an interference fit.

9. A gap sub according to claim 1 comprising a second electrically-insulating seal between the female member and the male member, wherein:
   the second seal is located within the opening of the female member at a tip of the female member;
   the second seal is located externally to the male member adjacent the at least a portion of the male member matingly received in the opening of the female member; and
   the second seal comprises a generally tubular body comprising a non-conductive material.

10. A gap sub according to claim 9 comprising one or more O-rings between the second seal and at least one of: the male member and the female member.

11. A gap sub according to claim 10 wherein each of the one or more O-rings are received in a groove on the second seal.

12. A gap sub according to claim 9 wherein the second seal comprises an axial flange protruding from an outer edge of the generally tubular body of the second seal and the axial flange is compressed in a space between the male member and the female member.

13. A gap sub according to claim 9 wherein a radial fit between the second seal and the male and female members is an interference fit.

14. A gap sub according to claim 9 wherein an axial fit between the second seal and the male and female members is an interference fit.

15. A gap sub according to claim 9 comprising a curable material substantially filling the insulating gap between the male member and the female member around the bodies between the first seal and the second seal.

16. A gap sub according to claim 15 wherein the first seal comprises a material having a higher melting temperature than a melting temperature of the curable material and the second seal comprises a material having a higher melting temperature than the melting temperature of the curable material.

17. A gap sub according to claim 15 wherein the first and second seals are effective to keep the curable material within the gap during injection of the curable material into the gap.

18. A gap sub according to claim 9 comprising a third electrically-insulating seal between the female member and the male member, wherein the third seal is concentric to and axially spaced apart from the second seal.

19. A gap sub according to claim 1 wherein one or more electrically insulating bodies are received in a circumferential channel defined by the male member and the female member near the internal gap sub seal to thereby secure the tip of the male member within the female member and maintain contact between the first seal and the male and female members.

20. A gap sub according to claim 1 wherein a curable material is injected to substantially fill the insulating gap between the male member and the female member around the bodies.

21. A gap sub according to claim 20 wherein the first seal comprises a material having a higher melting temperature than a melting temperature of the curable material.

22. A gap sub according to claim 1 wherein the first seal is removable while the opening matingly receives at least a portion of the male member.

23. A gap sub according to claim 1 wherein the first seal comprises one or more retainers within the internal bore of the first seal to hold the first seal between the tip of the male member and the female member.

24. A gap sub comprising:
   a male member;
   a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:
- a first section having a first internal diameter approximately equal to the external diameter of the tip of the male member; and
- a second section, defining an internal bore of the first seal, having an internal diameter approximately equal to an internal diameter of the bore of the male member and an internal diameter of the bore of the female member; and wherein:
- the first section of the first seal engages the tip of the male member; and
- the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

wherein the cavity is defined by a protrusion within the opening of the female member and the protrusion engages an internal shoulder formed into the internal bore of the first seal.

25. A gap sub comprising:
a male member;
a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:
- a first section having a first internal diameter approximately equal to the external diameter of the tip of the male member; and
- a second section, defining an internal bore of the first seal, having an internal diameter approximately equal to an internal diameter of the bore of the male member and an internal diameter of the bore of the female member; and wherein:
- the first section of the first seal engages the tip of the male member; and
- the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

a second electrically-insulating seal between the female member and the male member, wherein:
- the second seal is located within the opening of the female member at a tip of the female member;
- the second seal is located externally to the male member adjacent the at least a portion of the male member matingly received in the opening of the female member; and
- the second seal comprises a generally tubular body comprising a non-conductive material;

an external O-ring compressed in an external channel defined at least in part by an external groove on the second seal and an internal surface of the female member; and an internal O-ring compressed in an internal channel defined at least in part by an internal groove on the second seal and an external surface of the male member.

26. A gap sub according to claim 25 wherein the internal groove is a radially inward-facing groove.

27. A gap sub according to claim 26 wherein the external groove is a radially outward-facing groove.

28. A gap sub comprising:
a male member;
a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:
- a first section having a first internal diameter approximately equal to the external diameter of the tip of the male member; and
- a second section, defining an internal bore of the first seal, having an internal diameter approximately equal to an internal diameter of the bore of the male member and an internal diameter of the bore of the female member; and wherein:
- the first section of the first seal engages the tip of the male member; and
- the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

a second electrically-insulating seal between the female member and the male member, wherein:

the second seal is located within the opening of the female member at a tip of the female member;

the second seal is located externally to the male member adjacent the at least a portion of the male member matingly received in the opening of the female member; and the second seal comprises a generally tubular body comprising a non-conductive material; and a third electrically-insulating seal between the female member and the male member, wherein the third seal is concentric to and axially spaced apart from the second seal.

29. A gap sub according to claim 28 wherein the third seal is axially spaced apart from the second seal by an O-ring, wherein the O-ring is concentric to and compressed between the second and third seals.

30. A gap sub according to claim 28 wherein one or more protrusions extending radially inwardly from the female member are received by one or more external recesses of the third seal.

31. A gap sub according to claim 28 wherein one or more protrusions extending radially outwardly from the male member are received by one or more internal recesses of the third seal.

32. A gap sub comprising:
a male member;
a female member, the female member comprising an opening, wherein the opening matingly receives at least a portion of the male member in a radially spaced apart relationship to provide an electrically-insulating gap separating the male and female members;
the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and
wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;
a second electrically-insulating seal between the female member and the male member, wherein:
the second seal is located within the opening of the female member at a tip of the female member;
the second seal is located externally to the male member adjacent the at least a portion of the male member matingly received in the opening of the female member; and
the second seal comprises a generally tubular body comprising a non-conductive material;
wherein one or more protrusions extending radially inward from the female member are received by one or more external recesses of the second seal.

33. A gap sub comprising:
a male member;
a female member, the female member comprising an opening, wherein the opening matingly receives at least a portion of the male member in a radially spaced apart relationship to provide an electrically-insulating gap separating the male and female members;
the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and
wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;
a second electrically-insulating seal between the female member and the male member, wherein:
the second seal is located within the opening of the female member at a tip of the female member;
the second seal is located externally to the male member adjacent the at least a portion of the male member matingly received in the opening of the female member; and
the second seal comprises a generally tubular body comprising a non-conductive material;
wherein one or more protrusions extending radially outwardly from the male member are received by one or more internal recesses of the second seal.

34. A gap sub comprising:
a male member;
a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and
wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;
a second electrically-insulating seal between the female member and the male member, wherein:
the second seal is located within the opening of the female member at a tip of the female member;
the second seal is located externally to the male member adjacent the at least a portion of the male member matingly received in the opening of the female member; and
the second seal comprises a generally tubular body comprising a non-conductive material;
wherein:
the second seal comprises one or more indents;
at least a portion of the one or more electrically insulating bodies are adjacent the second seal and are spaced circumferentially around the male member; and
the one or more indents abut the at least a portion of the one or more electrically insulating bodies that are adjacent the second seal and are spaced circumferentially around the male member.

35. A gap sub comprising:
a male member;
a female member, the female member comprising an opening, wherein the opening matingly receives at least a portion of the male member in a radially spaced apart relationship to provide an electrically-insulating gap separating the male and female members;
the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and
wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;
wherein a curable material is injected to substantially fill the insulating gap between the male member and the female member around the bodies;
wherein a flange protrudes from an outer surface of the generally tubular body of the first seal and the flange is effective to prevent the curable material from progressing past the flange during injection of the curable material.

36. A gap sub according to claim 35 wherein the flange engages the male member and the female member.

37. A gap sub according to claim 35 wherein the flange is received by a shoulder of the female member.

38. A gap sub comprising:
a male member;
a female member, the female member comprising an opening, wherein the opening matingly receives at least a portion of the male member in a radially spaced apart relationship to provide an electrically-insulating gap separating the male and female members;
the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and
wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

wherein a curable material is injected to substantially fill the insulating gap between the male member and the female member around the bodies;

wherein a ramp portion protrudes from an outer surface of the generally tubular body of the first seal and the ramp portion is effective to direct the curable material away from the generally tubular body during injection of the curable material.

39. A gap sub comprising:

a male member;

a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:

a first section having a first internal diameter approximately equal to the external diameter of the tip of the male member; and a second section, defining an internal bore of the first seal, having an internal diameter approximately equal to an internal diameter of the bore of the male member and an internal diameter of the bore of the female member; and wherein:

the first section of the first seal engages the tip of the male member; and the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

wherein a first dielectric material is injected into a first gap defined at least in part by a first side of the first electrically insulating seal and a second dielectric material is injected into a second gap defined at least in part by a second side of the first electrically insulating seal.

40. A gap sub comprising:

a male member;

a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:

a first section having a first internal diameter approximately equal to the external diameter of the tip of the male member; and a second section, defining an internal bore of the first seal, having an internal diameter approximately equal to an internal diameter of the bore of the male member and an internal diameter of the bore of the female member; and wherein:

the first section of the first seal engages the tip of the male member; and the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

a second electrically-insulating seal between the female member and the male member, wherein:

the second seal is located within the opening of the female member at a tip of the female member;

the second seal is located externally to the male member adjacent the at least a portion of the male member matingly received in the opening of the female member; and the second seal comprises a generally tubular body comprising a non-conductive material;

wherein a first dielectric material is injected into a first gap defined at least in part by a first side of the second electrically insulating seal and a second dielectric material is injected into a second gap defined at least in part by a second side of the second electrically insulating seal.

41. A gap sub comprising:

a male member;

a female member, the female member comprising an opening, wherein the opening matingly receives at least a portion of the male member in a radially spaced apart relationship to provide an electrically-insulating gap separating the male and female members;

the male and female members having bores in fluid communication with one another to define a bore of the gap sub;

one or more electrically insulating bodies disposed between the male member and the female member, the bodies spaced apart around the male member to maintain the male member and the female member in the radially spaced apart relationship;

a first electrically-insulating seal disposed between a tip of the male member and the female member, the first seal located within the opening of the female member, wherein the first seal comprises a generally tubular body comprising:

a first section having a first internal diameter approximately equal to the external diameter of the tip of the male member; and a second section, defining an internal bore of the first seal, having an internal diameter approximately equal to an internal diameter of the bore of the male member and an internal diameter of the bore of the female member; and wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

wherein the first seal comprises one or more retainers within the internal bore of the first seal to hold the first seal between the tip of the male member and the female member;

wherein each of the one or more retainers is a spring to apply force exerted radially outward on an inner surface of the internal bore of the first seal.

42. A gap sub comprising:
a male member;
a female member, the female member comprising an opening, wherein the opening matingly receives at least a portion of the male member in a radially spaced apart relationship to provide an electrically-insulating gap separating the male and female members;
the male and female members having bores in fluid communication with one another to define a bore of the gap sub;
one or more electrically insulating bodies disposed between the male member and the female member, the bodies spaced apart around the male member to maintain the male member and the female member in the radially spaced apart relationship;
a first electrically-insulating seal disposed between a tip of the male member and the female member, the first seal located within the opening of the female member, wherein the first seal comprises a generally tubular body comprising:
a first section having a first internal diameter approximately equal to the external diameter of the tip of the male member; and
a second section, defining an internal bore of the first seal, having an internal diameter approximately equal to an internal diameter of the bore of the male member and an internal diameter of the bore of the female member; and wherein:
the first section of the first seal engages the tip of the male member; and
the internal bore of the male member abuts and is aligned with the internal bore of the first seal and the internal bore of the female member abuts and is aligned with the internal bore of the first seal, the first seal preventing fluid from entering the insulating gap between the male member and the female member from the bore of the gap sub;

a second electrically-insulating seal between the female member and the male member, wherein:
the second seal is located within the opening of the female member at a tip of the female member;
the second seal is located externally to the male member adjacent the at least a portion of the male member matingly received in the opening of the female member; and
the second seal comprises a generally tubular body comprising a non-conductive material;

wherein a ramp portion protrudes from an outer surface of the generally tubular body of the second seal and the ramp portion is effective to direct a curable material away from the generally tubular body during injection of the curable material.

* * * * *